United States Patent
Lu

(10) Patent No.: US 10,496,427 B2
(45) Date of Patent: Dec. 3, 2019

(54) METHOD FOR MANAGING MEMORY OF VIRTUAL MACHINE, PHYSICAL HOST, PCIE DEVICE AND CONFIGURATION METHOD THEREOF, AND MIGRATION MANAGEMENT DEVICE

(71) Applicant: Huawei Technologies Co., Ltd., Shenzhen (CN)

(72) Inventor: Shengwen Lu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 176 days.

(21) Appl. No.: 15/630,467

(22) Filed: Jun. 22, 2017

(65) Prior Publication Data

US 2017/0286149 A1 Oct. 5, 2017

Related U.S. Application Data

(63) Continuation of application No. PCT/CN2015/089811, filed on Sep. 16, 2015.

(30) Foreign Application Priority Data

Jan. 27, 2015 (CN) .......................... 2015 1 0041416

(51) Int. Cl.
  *G06F 9/455* (2018.01)
  *G06F 12/1009* (2016.01)
  (Continued)

(52) U.S. Cl.
  CPC ...... *G06F 9/45558* (2013.01); *G06F 12/0292* (2013.01); *G06F 12/1009* (2013.01);
  (Continued)

(58) Field of Classification Search
  None
  See application file for complete search history.

(56) References Cited

U.S. PATENT DOCUMENTS

| 2009/0313391 A1 | 12/2009 | Watanabe |
| 2011/0055433 A1* | 3/2011 | Kishore .............. G06F 13/4022 710/9 |

(Continued)

FOREIGN PATENT DOCUMENTS

| CN | 102819447 A | 12/2012 |
| CN | 103201721 A | 7/2013 |

(Continued)

OTHER PUBLICATIONS

Niu, Y. et al, Dynamic Memory Demand Estimating Based on the Guest Operating System Behaviors for Virtual Machines, Ninth IEEE International Symposium on Parallel and Distributed Processing with Applications, Jan. 2011, p. 81-86, Beijing, China.

*Primary Examiner* — Kenneth Tang
(74) *Attorney, Agent, or Firm* — Slater Matsil, LLP

(57) ABSTRACT

A method for managing a memory of a virtual machine, a physical host, a PCIE device and a configuration method thereof are provided. The method executed by a virtual machine includes: allocating a memory to a service carried on a PCIE device, where the memory includes multiple memory blocks, the multiple memory blocks is used to save working information of the service; generating a base address table BAT and a chip logic address table CLAT, where the BAT includes a CLAT entry base address corresponding to the service, and the CLAT includes a first address of each memory block; and sending an address of the BAT and a function number corresponding to the virtual machine to the PCIE device. Therefore, the PCIE device can obtain, according to the address of the BAT and the function number, working information of a service from the virtual machine.

16 Claims, 11 Drawing Sheets

(51) Int. Cl.
*G06F 12/1027* (2016.01)
*G06F 13/42* (2006.01)
*G06F 12/02* (2006.01)
*G06F 13/10* (2006.01)

(52) U.S. Cl.
CPC ........ *G06F 12/1027* (2013.01); *G06F 13/105* (2013.01); *G06F 13/4282* (2013.01); *G06F 2009/4557* (2013.01); *G06F 2009/45579* (2013.01); *G06F 2009/45583* (2013.01); *G06F 2212/151* (2013.01); *G06F 2212/6042* (2013.01); *G06F 2212/65* (2013.01); *G06F 2212/68* (2013.01); *G06F 2213/0026* (2013.01)

(56) References Cited

U.S. PATENT DOCUMENTS

| | | | |
|---|---|---|---|
| 2012/0036306 A1* | 2/2012 | Miyoshi | G06F 13/102 710/316 |
| 2012/0042034 A1 | 2/2012 | Goggin et al. | |
| 2012/0137292 A1 | 5/2012 | Iwamatsu et al. | |
| 2013/0254368 A1* | 9/2013 | Guay | G06F 9/45533 709/223 |
| 2014/0214922 A1 | 7/2014 | Kim et al. | |
| 2014/0281040 A1 | 9/2014 | Liu | |
| 2014/0365626 A1* | 12/2014 | Radhakrishnan | H04L 41/5054 709/222 |
| 2015/0052281 A1* | 2/2015 | Hart | G06F 13/16 710/308 |
| 2015/0052282 A1 | 2/2015 | Dong | |
| 2016/0132443 A1* | 5/2016 | Davda | G06F 13/28 710/308 |

FOREIGN PATENT DOCUMENTS

| | | |
|---|---|---|
| CN | 103942087 A | 7/2014 |
| CN | 104281532 A | 1/2015 |
| CN | 104636186 A | 5/2015 |
| WO | 2014032233 A1 | 3/2014 |
| WO | 2016119468 A1 | 8/2016 |

\* cited by examiner

METHOD FOR MANAGING MEMORY OF VIRTUAL MACHINE, PHYSICAL HOST, PCIE DEVICE AND CONFIGURATION METHOD THEREOF, AND MIGRATION MANAGEMENT DEVICE

CROSS-REFERENCE TO RELATED APPLICATIONS

This application is a continuation of International Application No. PCT/CN2015/089811, filed on Sep. 16, 2015, which claims priority to Chinese Patent Application No. 201510041416.2, filed on Jan. 27, 2015. The disclosures of the aforementioned applications are hereby incorporated by reference in their entireties.

TECHNICAL FIELD

The present disclosure relates to the field of virtual machines, and in particular, to a method for managing a memory of a virtual machine, a physical host, a PCIE device and a configuration method thereof, and a migration management device.

BACKGROUND

In a typical application architecture of a virtual machine, a virtual machine manager (VMM) providing a function of managing a virtual machine is installed on a physical host. The VMM manages one or more virtual machines, and each virtual machine can run an operating system (OS) and various applications. Generally, hardware of the physical host mainly includes: some hardware related to running of a virtual machine, for example, a central processing unit (CPU), a memory, and a hard disk, and some hardware with relatively independent functions that is not directly configured to run a virtual machine but is configured to execute some particular services, for example, a Peripheral Component Interconnect Express (PCIE) device (such as a network adapter and a video card) of the physical host.

Single-root I/O virtualization (SR-IOV) is an input/output (I/O) virtualization technology. With the technology, multiple virtual PCIE adapters can be obtained by means of virtualization on a physical PCIE adapter. This is referred to as a virtual function (VF). Using a network adapter that supports the SR-IOV as an example, multiple virtual network adapters can be obtained by means of virtualization on a physical network adapter, and a VF of each virtual machine is corresponding to one virtual network adapter.

After being virtualized, a server can easily implement live migration of a virtual machine. A live migration technology for a virtual machine refers to that a virtual machine is transferred from one physical host to another physical host by means of live migration, and service processing is slightly affected in the migration process.

In a process of implementing the present disclosure, the inventor finds that the prior art has at least the following problems:

In the prior art, during live migration of a virtual machine, data stored in a memory needs to be migrated to a destination physical host, and statuses of registers saved in a PCIE adapter also need to be migrated to the destination physical host. These registers are generally configured to record working information of services processed by the PCIE adapter. The working information is used for service statistics collection, service control, and service status recording. However, the registers that save the working information of the services are extremely decentralized. If live migration is performed, the statuses of these registers need to be saved and restored individually, causing much trouble.

SUMMARY

To resolve the problem in the prior art, embodiments of the present disclosure provide a method for managing a memory of a virtual machine, a physical host, a PCIE device and a configuration method thereof, and a migration management device. The technical solutions are as follows.

According to a first aspect, an embodiment of the present disclosure provides a method for managing a memory of a virtual machine, where the virtual machine runs on a physical host. The physical host is connected to a Peripheral Component Interconnect Express (PCIE) device. The PCIE device is a hardware device that supports the single-root I/O virtualization SR-IOV standard, and the PCIE device has at least one physical function (PF) and at least one virtual function (VF). A unique function number is configured for each PF and each VF separately. The method includes allocating, by the virtual machine, a memory to at least one service carried on the PCIE device, where the memory allocated to each service includes multiple memory blocks, each of the multiple memory blocks is used to save working information of a corresponding service, and each memory block is a section of memory space in which guest physical addresses are consecutive. The method also includes generating, by the virtual machine, a base address table BAT and a chip logic address table CLAT according to the memory allocated to each service, where the BAT includes a CLAT entry base address corresponding to each service, and the CLAT includes a first address of each memory block. The method also includes sending, by the virtual machine, an address of the BAT and a function number corresponding to the virtual machine to the PCIE device.

In a first possible implementation manner of the first aspect, the at least one service includes a to-be-processed service, and the method further includes: receiving a request message that is used to obtain working information of the to-be-processed service and that is sent by the PCIE device, where the request message includes the address of the BAT, a service type of the to-be-processed service, and a service number of the to-be-processed service; and sending, to the PCIE device according to the request message, working information in a memory block corresponding to the to-be-processed service.

According to the first possible implementation manner of the first aspect, the sending, to the PCIE device according to the request message, working information in a memory block corresponding to the to-be-processed service includes: obtaining the BAT corresponding to the address of the BAT; determining, according to the service type of the to-be-processed service and the BAT, a CLAT entry base address corresponding to the service type; determining an entry offset according to the service number of the to-be-processed service; obtaining, according to the CLAT entry base address and the entry offset, a CLAT entry corresponding to the to-be-processed service; and sending, to the PCIE device, working information in a memory block corresponding to the CLAT entry that is corresponding to the to-be-processed service.

According to the second possible implementation manner of the first aspect, in a third possible implementation manner of the first aspect, the CLAT is a single-level CLAT or a multi-level CLAT; the multi-level CLAT includes N levels of CLAT, where N≥2, and N is an integer; each level of CLAT includes multiple entries; each entry in the $n^{th}$ level of CLAT is used to indicate an address of the $(n+1)^{th}$ level of CLAT, where $2 \le n < n+1 < N$, and n is an integer; and each entry in the $N^{th}$ level of CLAT is used to indicate a first address of one of the memory blocks.

According to the third possible implementation manner of the first aspect, in a fourth possible implementation manner of the first aspect, sizes of the multiple memory blocks allocated to the to-be-processed service are the same; and the determining an entry offset according to the service number of the to-be-processed service includes: when the CLAT is a single-level CLAT, multiplying the service number of the to-be-processed service by a size of a memory occupied by the working information of the to-be-processed service, and dividing a result of the multiplication by the size of the memory block allocated to the to-be-processed service, to obtain a quotient and a remainder for the single-level CLAT, where when the remainder for the single-level CLAT is greater than 0, the entry offset is equal to the quotient for the single-level CLAT, or when the remainder for the single-level CLAT is equal to 0, the entry offset is equal to the quotient for the single-level CLAT minus 1; or when the CLAT is a multi-level CLAT, where the entry offset includes an entry offset of each level of CLAT, calculating an entry offset of the $x^{th}$ level of CLAT in the following manner:

$$\begin{cases} \dfrac{\text{Service number} \times A}{C^{N-X} \times B} = \text{Quotient and remainder for the } x^{th} \text{ level of } CLAT, x = 1 \\[2ex] \dfrac{\text{Remainder for the } (x-1)^{th} \text{ level of } CLAT \times A}{C^{N-X} \times B} = \text{Quotient and remainder for the } x^{th} \text{ level of } CLAT, N \ge x \ge 2 \end{cases}$$

where when a remainder for the $x^{th}$ level of CLAT is greater than 0, the entry offset of the $x^{th}$ level of CLAT is equal to a quotient for the $x^{th}$ level of CLAT; or when a remainder for the $x^{th}$ level of CLAT is equal to 0, the entry offset of the $x^{th}$ level of CLAT is equal to a quotient for the $x^{th}$ level of CLAT minus 1, where A is a size of a memory occupied by the working information of the to-be-processed service, B is the size of the memory block allocated to the to-be-processed service, and C is a quantity of entries in the $N^{th}$ level of CLAT.

According to a second aspect, an embodiment of the present disclosure further provides a method for configuring a Peripheral Component Interconnect Express (PCIE) device, where the PCIE device is connected to a physical host. At least one virtual machine runs on the physical host. The PCIE device is a hardware device that supports the single-root I/O virtualization SR-IOV standard, and the PCIE device has at least one physical function (PF) and at least one virtual function (VF). A unique function number is configured for each PF and each VF separately. Each virtual machine includes a base address table (BAT), where the BAT is generated by a virtual machine, to which the BAT belongs, according to a memory allocated to at least one service carried on the PCIE device. The memory allocated to each service includes multiple memory blocks, each of the multiple memory blocks is used to save working information of a corresponding service, and each memory block is a section of memory space in which guest physical addresses are consecutive. The BAT includes a chip logic address table (CLAT) entry base address corresponding to each service, and the CLAT includes a first address of each memory block.

The method includes: receiving, by the PCIE device, an address of the base address table BAT on each virtual machine and a function number corresponding to each virtual machine. The method also includes saving a correspondence between the address of the BAT and the function number into a virtual machine configuration table (VCT).

In a first possible implementation manner of the second aspect, the at least one service includes a to-be-processed service, and the method further includes: determining, according to service information of the to-be-processed service and the VCT, an address of a BAT corresponding to the to-be-processed service; and obtaining, from a memory corresponding to the to-be-processed service, working information of the to-be-processed service according to the address of the BAT corresponding to the to-be-processed service, a service type of the to-be-processed service, and a service number of the to-be-processed service.

According to the first possible implementation manner of the second aspect, in a second possible implementation manner of the second aspect, the determining, according to service information of the to-be-processed service and the VCT, an address of a BAT corresponding to the to-be-processed service includes: receiving the service information, sent by a host side or a network side, of the to-be-processed service; determining a function number corresponding to the to-be-processed service, according to a feature in the service information, sent by the host side, of the to-be-processed service or according to a PCIE interface used when the service information, transmitted by the host side, of the to-be-processed service is received, where the feature is used to indicate the function number corresponding to the to-be-processed service; and determining, according to the VCT and the determined function number corresponding to the to-be-processed service, the address of the BAT corresponding to the function number that is corresponding to the to-be-processed service.

According to the second possible implementation manner of the second aspect, in a third possible implementation manner of the second aspect, the obtaining, from a memory corresponding to the to-be-processed service, working information of the to-be-processed service according to the address of the BAT corresponding to the to-be-processed service, a service type of the to-be-processed service, and a service number of the to-be-processed service includes: sending a request message to a virtual machine corresponding to the determined function number that is corresponding to the to-be-processed service, where the request message includes the address of the BAT corresponding to the function number that is corresponding to the to-be-processed service, the service type of the to-be-processed service, and the service number of the to-be-processed service; and receiving working information, of the to-be-processed service, sent by the virtual machine corresponding to the function number that is corresponding to the to-be-processed service, where the working information of the to-be-processed service is obtained from a memory block corresponding to the request message by the virtual machine corresponding to the function number that is corresponding to the to-be-processed service.

According to the first or the second possible implementation manner of the second aspect, in a fourth possible implementation manner of the second aspect, the obtaining, from a memory corresponding to the to-be-processed service, working information of the to-be-processed service according to the address of the BAT corresponding to the to-be-processed service, a service type of the to-be-processed service, and a service number of the to-be-processed service includes: reading, according to the address of the BAT corresponding to the to-be-processed service, the BAT corresponding to the to-be-processed service; determining, according to the service type of the to-be-processed service, a CLAT entry base address corresponding to the service type of the to-be-processed service from the BAT corresponding to the to-be-processed service; determining an entry offset according to the service number of the to-be-processed service; reading a CLAT entry corresponding to the entry offset and the CLAT entry base address that is corresponding to the service type of the to-be-processed service; and reading working information in a memory block corresponding to the CLAT entry.

According to the fourth possible implementation manner of the second aspect, in a fifth possible implementation manner of the second aspect, the CLAT is a single-level CLAT or a multi-level CLAT; the multi-level CLAT includes N levels of CLAT, where N≥2, and N is an integer; each level of CLAT includes multiple entries; each entry in the $n^{th}$ level of CLAT is used to indicate an address of the $(n+1)^{th}$ level of CLAT, where 2≤n<n+1<N, and n is an integer; and each entry in the $N^{th}$ level of CLAT is used to indicate a first address of one of the memory blocks.

According to the fifth possible implementation manner of the second aspect, in a sixth possible implementation manner of the second aspect, sizes of the multiple memory blocks allocated to the to-be-processed service are the same; and the determining an entry offset according to the service number of the to-be-processed service includes: when the CLAT is a single-level CLAT, multiplying the service number of the to-be-processed service by a size of a memory occupied by the working information of the to-be-processed service, and dividing a result of the multiplication by the size of the memory block allocated to the to-be-processed service, to obtain a quotient and a remainder for the single-level CLAT, where when the remainder for the single-level CLAT is greater than 0, the entry offset is equal to the quotient for the single-level CLAT, or when the remainder for the single-level CLAT is equal to 0, the entry offset is equal to the quotient for the single-level CLAT minus 1; or when the CLAT is a multi-level CLAT, where the entry offset includes an entry offset of each level of CLAT, calculating an entry offset of the $x^{th}$ level of CLAT in the following manner:

$$\begin{cases} \dfrac{\text{Service number} \times A}{C^{N-X} \times B} = \begin{array}{l} \text{Quotient and remainder for} \\ \text{the } x^{th} \text{ level of } CLAT, x = 1 \end{array} \\ \\ \dfrac{\text{Remainder for the} \\ (x-1)^{th} \text{ level of } CLAT \times A}{C^{N-X} \times B} = \begin{array}{l} \text{Quotient and remainder for} \\ \text{the } x^{th} \text{ level of } CLAT, N \ge x \ge 2 \end{array} \end{cases}$$

where when a remainder for the $x^{th}$ level of CLAT is greater than 0, the entry offset of the $x^{th}$ level of CLAT is equal to a quotient for the $x^{th}$ level of CLAT; or when a remainder for the $x^{th}$ level of CLAT is equal to 0, the entry offset of the $x^{th}$ level of CLAT is equal to a quotient for the $x^{th}$ level of CLAT minus 1, where A is a size of a memory occupied by the working information of the to-be-processed service, B is the size of the memory block allocated to the to-be-processed service, and C is a quantity of entries in the $N^{th}$ level of CLAT.

According to a third aspect, an embodiment of the present disclosure further provides a method for managing a memory of a virtual machine. The method includes obtaining, by a migration management device on a destination physical host, an address of a base address table (BAT) on a virtual machine of a source physical host during live migration, where the destination physical host and the source physical host are connected to different Peripheral Component Interconnect Express (PCIE) devices, the PCIE device is a hardware device that supports the single-root I/O virtualization (SR-IOV) standard, and the PCIE device has at least one physical function (PF) and at least one virtual function (VF), where a unique function number is configured for each PF and each VF separately. The method also includes obtaining a function number corresponding to a migrated virtual machine. The method also includes configuring a correspondence between the address of the BAT and the function number into a virtual machine configuration table (VCT) in a PCIE device connected to the destination physical host.

According to a fourth aspect, an embodiment of the present disclosure further provides a physical host. A virtual machine runs on the physical host. The physical host is connected to a Peripheral Component Interconnect Express (PCIE) device. The PCIE device is a hardware device that supports the single-root I/O virtualization (SR-IOV) standard, and the PCIE device has at least one physical function (PF) and at least one virtual function (VF). A unique function number is configured for each PF and each VF separately. The virtual machine includes: an allocation module, configured to allocate a memory to at least one service carried on the PCIE device, where the memory allocated to each service includes multiple memory blocks, each of the multiple memory blocks is used to save working information of a corresponding service, and each memory block is a section of memory space in which guest physical addresses are consecutive. The virtual machine also includes an entry generation module, configured to generate a base address table (BAT) and a chip logic address table (CLAT) according to the memory allocated to each service, where the BAT includes a CLAT entry base address corresponding to each service, and the CLAT includes a first address of each memory block. The virtual machine also includes a sending module, configured to send an address of the BAT and a function number corresponding to the virtual machine to the PCIE device.

In a first possible implementation manner of the fourth aspect, the at least one service includes a to-be-processed service, and the virtual machine further includes: a receiving module, configured to receive a request message that is used to obtain working information of the to-be-processed service and that is sent by the PCIE device, where the request message includes the address of the BAT, a service type of the to-be-processed service, and a service number of the to-be-processed service; and the sending module is further configured to send, to the PCIE device according to the request message, working information in a memory block corresponding to the to-be-processed service.

According to the first possible implementation manner of the fourth aspect, in a second possible implementation manner of the fourth aspect, the sending module is specifically configured to: obtain the BAT corresponding to the address of the BAT; determine, according to the service type of the to-be-processed service and the BAT, a CLAT entry base address corresponding to the service type; determine an entry offset according to the service number of the to-be-processed service; obtain, according to the CLAT entry base address and the entry offset, a CLAT entry corresponding to the to-be-processed service; and send, to the PCIE device, working information in a memory block corresponding to the CLAT entry that is corresponding to the to-be-processed service.

According to the second possible implementation manner of the fourth aspect, in a third possible implementation manner of the fourth aspect, the CLAT is a single-level CLAT or a multi-level CLAT; the multi-level CLAT includes N levels of CLAT, where N≥2, and N is an integer; each level of CLAT includes multiple entries; each entry in the $n^{th}$ level of CLAT is used to indicate an address of the $(n+1)^{th}$ level of CLAT, where 2≤n<n+1<N, and n is an integer; and each entry in the $N^{th}$ level of CLAT is used to indicate a first address of one of the memory blocks.

According to the third possible implementation manner of the fourth aspect, in a fourth possible implementation manner of the fourth aspect, sizes of the multiple memory blocks allocated to the to-be-processed service are the same; and the sending module is specifically configured to: when the CLAT is a single-level CLAT, multiply the service number of the to-be-processed service by a size of a memory occupied by the working information of the to-be-processed service, and divide a result of the multiplication by the size of the memory block allocated to the to-be-processed service, to obtain a quotient and a remainder for the single-level CLAT, where when the remainder for the single-level CLAT is greater than 0, the entry offset is equal to the quotient for the single-level CLAT, or when the remainder for the single-level CLAT is equal to 0, the entry offset is equal to the quotient for the single-level CLAT minus 1; or when the CLAT is a multi-level CLAT, where the entry offset includes an entry offset of each level of CLAT, calculate an entry offset of the $x^{th}$ level of CLAT in the following manner:

$$\begin{cases} \dfrac{\text{Service number} \times A}{C^{N-X} \times B} = \text{Quotient and remainder for the } x^{th} \text{ level of } CLAT, x = 1 \\ \dfrac{\text{Remainder for the } (x-1)^{th} \text{ level of } CLAT \times A}{C^{N-X} \times B} = \text{Quotient and remainder for the } x^{th} \text{ level of } CLAT, N \geq x \geq 2 \end{cases}$$

where when a remainder for the $x^{th}$ level of CLAT is greater than 0, the entry offset of the $x^{th}$ level of CLAT is equal to a quotient for the $x^{th}$ level of CLAT; or when a remainder for the $x^{th}$ level of CLAT is equal to 0, the entry offset of the $x^{th}$ level of CLAT is equal to a quotient for the $x^{th}$ level of CLAT minus 1, where A is a size of a memory occupied by the working information of the to-be-processed service, B is the size of the memory block allocated to the to-be-processed service, and C is a quantity of entries in the $N^{th}$ level of CLAT.

According to a fifth aspect, an embodiment of the present disclosure further provides a PCIE device, where the PCIE device is connected to a physical host. At least one virtual machine runs on the physical host. The PCIE device is a hardware device that satisfies the single-root I/O virtualization (SR-IOV) standard. The PCIE device has at least one physical function (PF) and at least one virtual function (VF), where a unique function number is configured for each PF and each VF separately. Each virtual machine includes a base address table (BAT), where the BAT is generated by a virtual machine, to which the BAT belongs, according to a memory allocated to at least one service carried on the PCIE device. The memory allocated to each service includes multiple memory blocks, each of the multiple memory blocks is used to save working information of a corresponding service, and each memory block is a section of memory space in which guest physical addresses are consecutive. The BAT includes a chip logic address table (CLAT) entry base address corresponding to each service, and the CLAT includes a first address of each memory block. The PCIE device further includes a receiving module, configured to receive an address of the base address table BAT on each virtual machine and a function number corresponding to each virtual machine. The PCI device also includes a generation module, configured to save a correspondence between the address of the BAT and the function number into a virtual machine configuration table (VCT).

In a first possible implementation manner of the fifth aspect, the at least one service includes a to-be-processed service, and the PCIE device further includes: a determining module, configured to determine, according to service information of the to-be-processed service and the VCT, an address of a BAT corresponding to the to-be-processed service; and an obtaining module, configured to obtain, from a memory corresponding to the to-be-processed service, working information of the to-be-processed service according to the address of the BAT corresponding to the to-be-processed service, a service type of the to-be-processed service, and a service number of the to-be-processed service.

According to the first possible implementation manner of the fifth aspect, in a second possible implementation manner of the fifth aspect, the receiving module is further configured to receive the service information, sent by a host side or a network side, of the to-be-processed service; and the determining module is specifically configured to: determine a function number corresponding to the to-be-processed service, according to a feature in the service information, sent by the host side, of the to-be-processed service or according to a PCIE interface used when the service information, transmitted by the host side, of the to-be-processed service is received, where the feature is used to indicate the function number corresponding to the to-be-processed service; and determine, according to the VCT and the determined function number corresponding to the to-be-processed service, the address of the BAT corresponding to the function number that is corresponding to the to-be-processed service.

According to the second possible implementation manner of the fifth aspect, in a third possible implementation manner of the fifth aspect, the obtaining module is specifically configured to: send a request message to a virtual machine corresponding to the determined function number that is corresponding to the to-be-processed service, where the request message includes the address of the BAT corresponding to the function number that is corresponding to the to-be-processed service, the service type of the to-be-processed service, and the service number of the to-be-processed service; and receive working information, of the to-be-processed service, sent by the virtual machine corresponding to the function number that is corresponding to the to-be-processed service, where the working information of the to-be-processed service is obtained from a memory block corresponding to the request message by the virtual machine corresponding to the function number that is corresponding to the to-be-processed service.

According to the first or the second possible implementation manner of the fifth aspect, in a fourth possible implementation manner of the fifth aspect, the obtaining module is specifically configured to: read, according to the address of the BAT corresponding to the to-be-processed service, the BAT corresponding to the to-be-processed service; determine, according to the service type of the to-beprocessed service, a CLAT entry base address corresponding to the service type of the to-be-processed service from the BAT corresponding to the to-be-processed service; determine an entry offset according to the service number of the to-be-processed service; read a CLAT entry corresponding to the entry offset and the CLAT entry base address that is corresponding to the service type of the to-be-processed service; and read working information in a memory block corresponding to the CLAT entry.

According to the fourth possible implementation manner of the fifth aspect, in a fifth possible implementation manner of the fifth aspect, the CLAT is a single-level CLAT or a multi-level CLAT; the multi-level CLAT includes N levels of CLAT, where N≥2, and N is an integer; each level of CLAT includes multiple entries; each entry in the $n^{th}$ level of CLAT is used to indicate an address of the (n+1)th level of CLAT, where 2≤n<n+1<N, and n is an integer; and each entry in the $N^{th}$ level of CLAT is used to indicate a first address of one of the memory blocks.

According to the fifth possible implementation manner of the fifth aspect, in a sixth possible implementation manner of the fifth aspect, sizes of the multiple memory blocks allocated to the to-be-processed service are the same; and the obtaining module is specifically configured to: when the CLAT is a single-level CLAT, multiply the service number of the to-be-processed service by a size of a memory occupied by the working information of the to-be-processed service, and divide a result of the multiplication by the size of the memory block allocated to the to-be-processed service, to obtain a quotient and a remainder for the single-level CLAT, where when the remainder for the single-level CLAT is greater than 0, the entry offset is equal to the quotient for the single-level CLAT, or when the remainder for the single-level CLAT is equal to 0, the entry offset is equal to the quotient for the single-level CLAT minus 1; or when the CLAT is a multi-level CLAT, where the entry offset includes an entry offset of each level of CLAT, calculate an entry offset of the $x^{th}$ level of CLAT in the following manner:

$$\begin{cases} \dfrac{\text{Service number} \times A}{C^{N-X} \times B} = \text{Quotient and remainder for the } x^{th} \text{ level of } CLAT, x = 1 \\ \\ \dfrac{\text{Remainder for the } (x-1)^{th} \text{ level of } CLAT \times A}{C^{N-X} \times B} = \text{Quotient and remainder for the } x^{th} \text{ level of } CLAT, N \geq x \geq 2 \end{cases}$$

where when a remainder for the $x^{th}$ level of CLAT is greater than 0, the entry offset of the $x^{th}$ level of CLAT is equal to a quotient for the $x^{th}$ level of CLAT; or when a remainder for the $x^{th}$ level of CLAT is equal to 0, the entry offset of the $x^{th}$ level of CLAT is equal to a quotient for the $x^{th}$ level of CLAT minus 1, where A is a size of a memory occupied by the working information of the to-be-processed service, B is the size of the memory block allocated to the to-be-processed service, and C is a quantity of entries in the $N^{th}$ level of CLAT.

According to a sixth aspect, an embodiment of the present disclosure further provides a migration management device, where the migration management device is disposed on a destination physical host. The migration management device includes a first obtaining module, configured to obtain an address of a base address table BAT on a virtual machine of a source physical host during live migration, where the destination physical host and the source physical host are connected to different Peripheral Component Interconnect Express (PCIE) devices. The PCIE device is a hardware device that supports the single-root I/O virtualization (SR-IOV) standard. The PCIE device has at least one physical function (PF) and at least one virtual function (VF), where a unique function number is configured for each PF and each VF separately. The migration management device also includes a second obtaining module, configured to obtain a function number corresponding to a migrated virtual machine. The migration management device also includes a configuration module, configured to configure a correspondence between the address of the BAT and the function number into a virtual machine configuration table (VCT) in a PCIE device connected to the destination physical host.

According to a seventh aspect, an embodiment of the present disclosure further provides a physical host, where the physical host includes a processor, a memory, an input/output unit, and a bus; the memory is configured to store a computer-executable instruction; the processor is connected to the memory by using the bus; and when the physical host is running, the processor executes the computer-executable instruction stored in the memory, so that the computer executes the method for managing a memory of a virtual machine provided in the first aspect or the third aspect.

Beneficial effects of the technical solutions provided in the embodiments of the present disclosure are as follows.

During service processing, working information in a memory block is searched for according to a feature in a service packet and a service number, and the working information is read by means of temporary storage. This is easy to operate and requires less time. During live migration of a virtual machine, problems caused by register migration are avoided, and a VMM automatically and directly migrates a memory block, a BAT, and a CLAT to a destination virtual machine, provided that a correspondence between a function number corresponding to a migrated virtual machine and a first address of the BAT on a virtual machine of a source physical host is configured into a VCT in a PCIE adapter after the migration. This is simple and easy to implement, greatly increases a live migration speed of a virtual machine, and reduces a shutdown time.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show only some embodiments of the present disclosure, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present disclosure clearer, the following further describes the embodiments of the present disclosure in detail with reference to the accompanying drawings.

Figure 1:
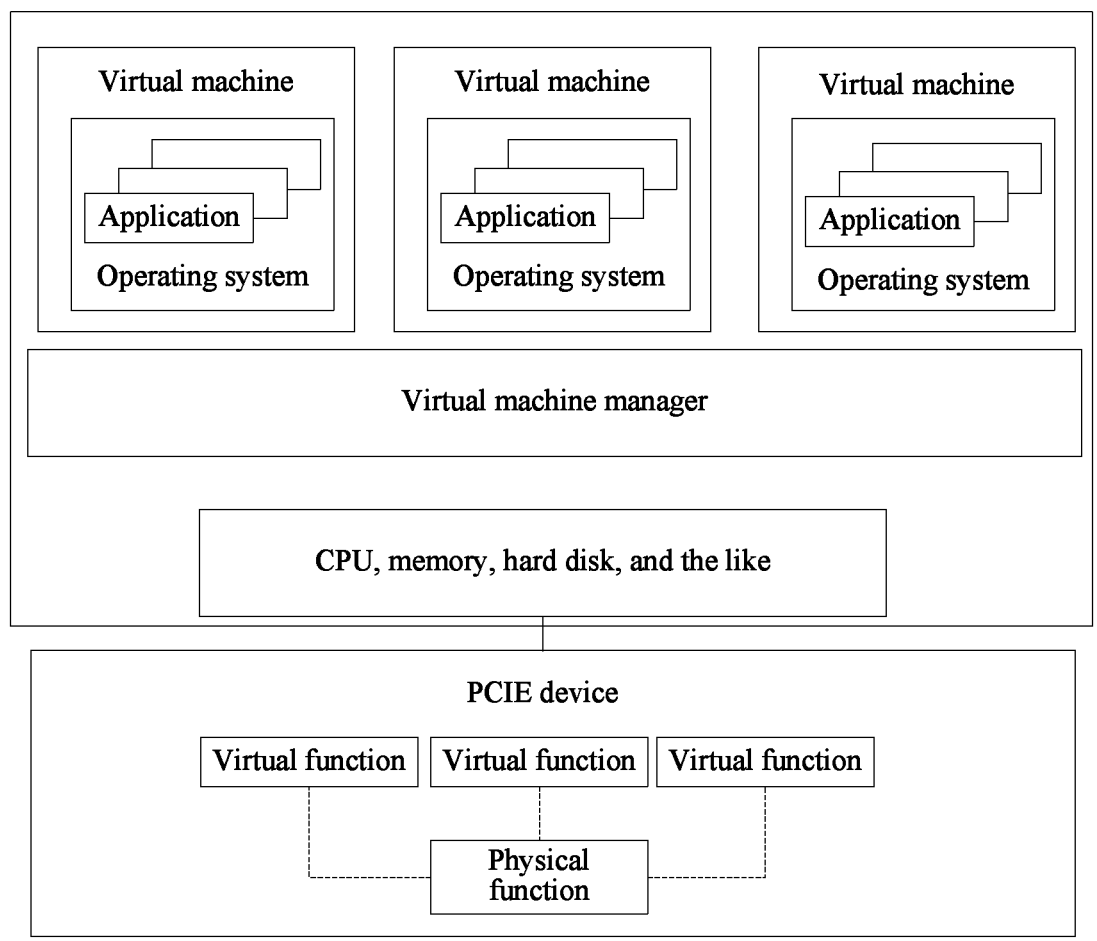
FIG. 1 is a diagram of an application scenario according to the embodiments of the present disclosure.

For ease of description of the embodiments, an application scenario of the embodiments of the present disclosure is first briefly described as follows. Referring to FIG. 1, a virtual machine manager (VMM) and at least one virtual machine run on a physical host. The VMM can manage one or more virtual machines. Each virtual machine can run an operating system OS and various applications. The physical host may be connected to a PCIE device, and the PCIE device is a hardware device that supports the single-root I/O virtualization (SR-IOV) standard. The PCIE device has at least one physical function (PF) and at least one virtual function (VF). A unique function number is configured for each PF and each VF separately. The virtual machine executes a particular service by using a PF or a VF. Each PF or VF is corresponding to one virtual machine. A correspondence between a function number of a PF or a function number of a VF and a virtual machine may be saved in the PCIE device.

The physical host includes hardware related to running of a virtual machine, for example, a CPU and at least one storage (a hard disk, a memory, and the like) of a computer readable storage medium. In addition, the physical host may further include a communications unit, an input unit, a display unit, and the like. The PCIE device may be a PCIE adapter, for example, a network adapter, and a video card.

The physical host may further include a migration management device. During live migration of a virtual machine, a migration management device on a source physical host migrates data stored in a memory to a destination physical host. In an implementation manner, the migration management device may be the foregoing VMM.

It should be noted that the foregoing device types and connection manners are only examples, and the present disclosure imposes no limitation thereon.

Embodiment 1

Figure 2:
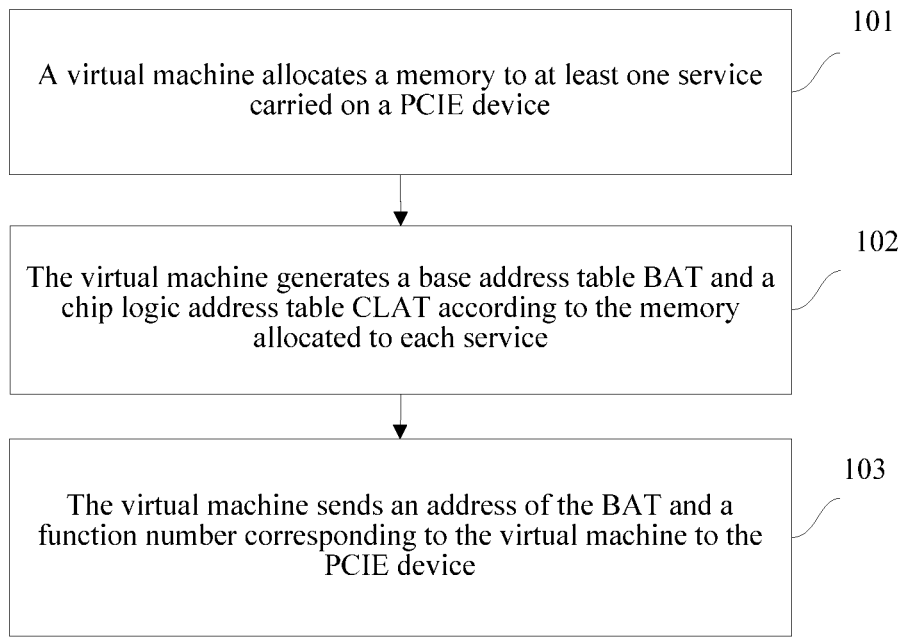
FIG. 2 is a flowchart of a method for managing a memory of a virtual machine according to Embodiment 1 of the present disclosure.

This embodiment of the present disclosure provides a method for managing a memory of a virtual machine. The method is executed by one of the foregoing at least one virtual machine. Referring to FIG. 2, the method includes the following steps.

Step 101. The virtual machine allocates a memory to at least one service carried on a PCIE device, where the memory allocated to each service includes multiple memory blocks, each of the multiple memory blocks is used to save working information of a corresponding service, and each memory block is a section of memory space in which guest physical addresses are consecutive.

Step 102. The virtual machine generates a base address table (BAT) and a chip logic address table (CLAT) according to the memory allocated to each service, where the BAT includes a CLAT entry base address corresponding to each service, and the CLAT includes a first address of each memory block.

Step 103. The virtual machine sends an address of the BAT and a function number corresponding to the virtual machine to the PCIE device, where the PCIE device is configured to: record a correspondence between the address of the BAT and the function number, and obtain, from the virtual machine, working information of a service according to the correspondence between the address of the BAT and the function number.

The correspondence between the address of the BAT and the function number may be saved in a virtual machine configuration table (VCT).

In this embodiment of the present disclosure, a virtual machine allocates a memory to at least one service carried on a PCIE device, generates a BAT and a CLAT according to the memory allocated to each service, and sends an address of the BAT and a function number to the PCIE device, so that the PCIE device can record a correspondence between the address of the BAT and the function number. During service processing, the PCIE device obtains, from the virtual machine, working information of a service according to the correspondence between the address of the BAT and the function number. This is easy to operate and requires less time. During live migration of a virtual machine, problems caused by register migration are avoided, provided that a memory block, a BAT, and a CLAT are directly migrated to a destination physical machine, and that a correspondence between a function number corresponding to a migrated virtual machine and an address of the BAT on a virtual machine of a source physical host is configured into a VCT in a PCIE device after the migration. This is simple and easy to implement, greatly increases a live migration speed of a virtual machine, and reduces a shutdown time.

Embodiment 2

Figure 3:
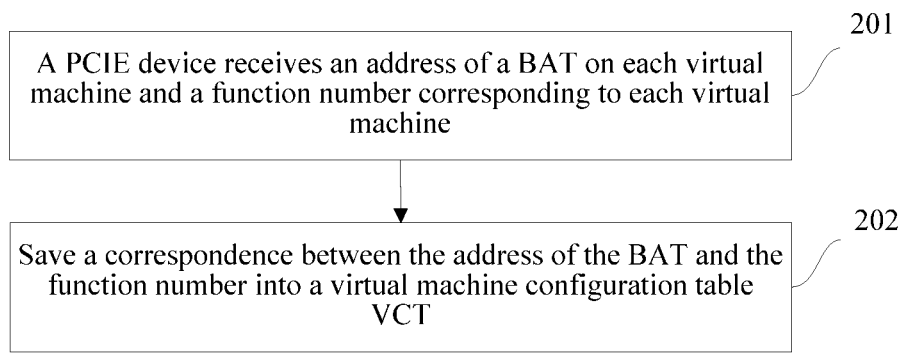
FIG. 3 is a flowchart of a method for configuring a PCIE device according to Embodiment 2 of the present disclosure.

This embodiment of the present disclosure provides a method for configuring a PCIE device. The method is executed by the foregoing PCIE device. Referring to FIG. 3, the method includes the following steps.

Step 201. The PCIE device receives an address of a BAT on each virtual machine and a function number corresponding to each virtual machine, where each virtual machine includes a base address table BAT, the BAT is generated by a virtual machine, to which the BAT belongs, according to a memory allocated to at least one service carried on the PCIE device; the memory allocated to each service includes multiple memory blocks, each of the multiple memory blocks is used to save working information of a corresponding service, each memory block is a section of memory space in which guest physical addresses are consecutive; the BAT includes a CLAT entry base address corresponding to each service, and a CLAT includes a first address of each memory block.

Step 202. Save a correspondence between the address of the BAT and the function number into a virtual machine configuration table (VCT), so that the VCT includes the correspondence between the function number and the address of the BAT.

In this embodiment of the present disclosure, a PCIE device receives an address of a BAT and a function number, and saves a correspondence between the address of the BAT and the function number into a virtual machine configuration table (VCT). During service processing, the PCIE device obtains, from a virtual machine, working information of a service according to the correspondence between the address of the BAT and the function number. This is easy to operate and requires less time. During live migration of a virtual machine, problems caused by register migration are avoided, provided that a memory block, a BAT, and a CLAT are directly migrated to a destination physical host, and that a correspondence between a function number corresponding to a migrated virtual machine and an address of the BAT on a virtual machine of a source physical host is configured into a VCT in a PCIE device after the migration. This is simple and easy to implement, greatly increases a live migration speed of a virtual machine, and reduces a shutdown time.

Embodiment 3

Figure 4:
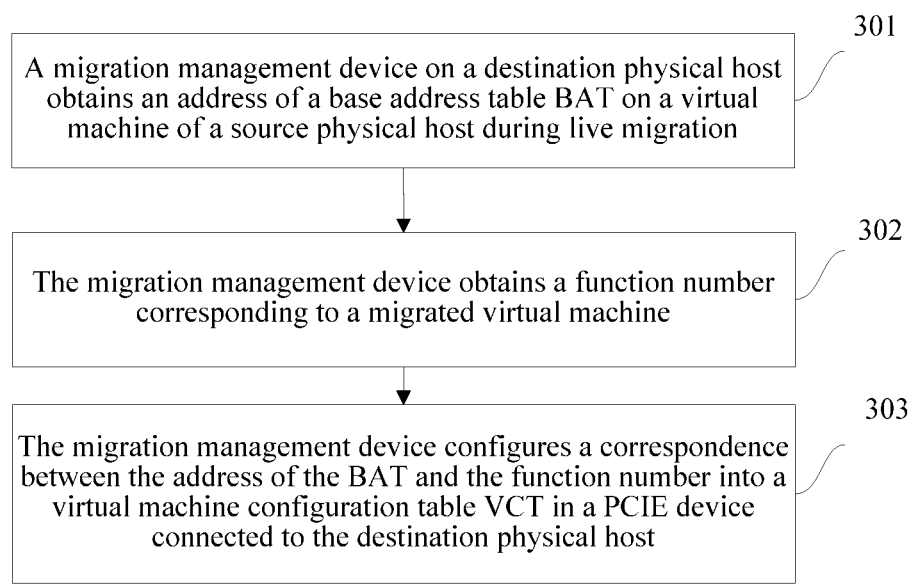
FIG. 4 is a flowchart of a method for managing a memory of a virtual machine according to Embodiment 3 of the present disclosure.

This embodiment of the present disclosure provides a method for managing a memory of a virtual machine. The method is executed by the foregoing migration management device. Referring to FIG. 4, the method includes the following steps.

Step 301. The migration management device on a destination physical host obtains an address of a base address table BAT on a virtual machine of a source physical host during live migration, where the destination physical host and the source physical host are connected to different Peripheral Component Interconnect Express (PCIE) devices, the PCIE device is a hardware device that supports the single-root I/O virtualization (SR-IOV) standard, and the PCIE device has at least one physical function (PF) and at least one virtual function (VF), where a unique function number is configured for each PF and each VF separately.

The migration management device in this embodiment may be a VMM.

Step 302. The migration management device obtains a function number corresponding to a migrated virtual machine.

Step 303. The migration management device configures a correspondence between the address of the BAT and the function number into a virtual machine configuration table (VCT) in a PCIE device connected to the destination physical host.

In this embodiment of the present disclosure, during live migration of a virtual machine, problems caused by register migration are avoided, provided that a memory block, a BAT, and a CLAT are automatically and directly migrated to a destination physical machine during a migration process, and that a correspondence between a function number corresponding to a migrated virtual machine and an address of the BAT on a virtual machine of a source physical host is configured into a VCT in a PCIE device after the migration. This is simple and easy to implement, greatly increases a live migration speed of a virtual machine, and reduces a shutdown time.

Embodiment 4

Figure 5:
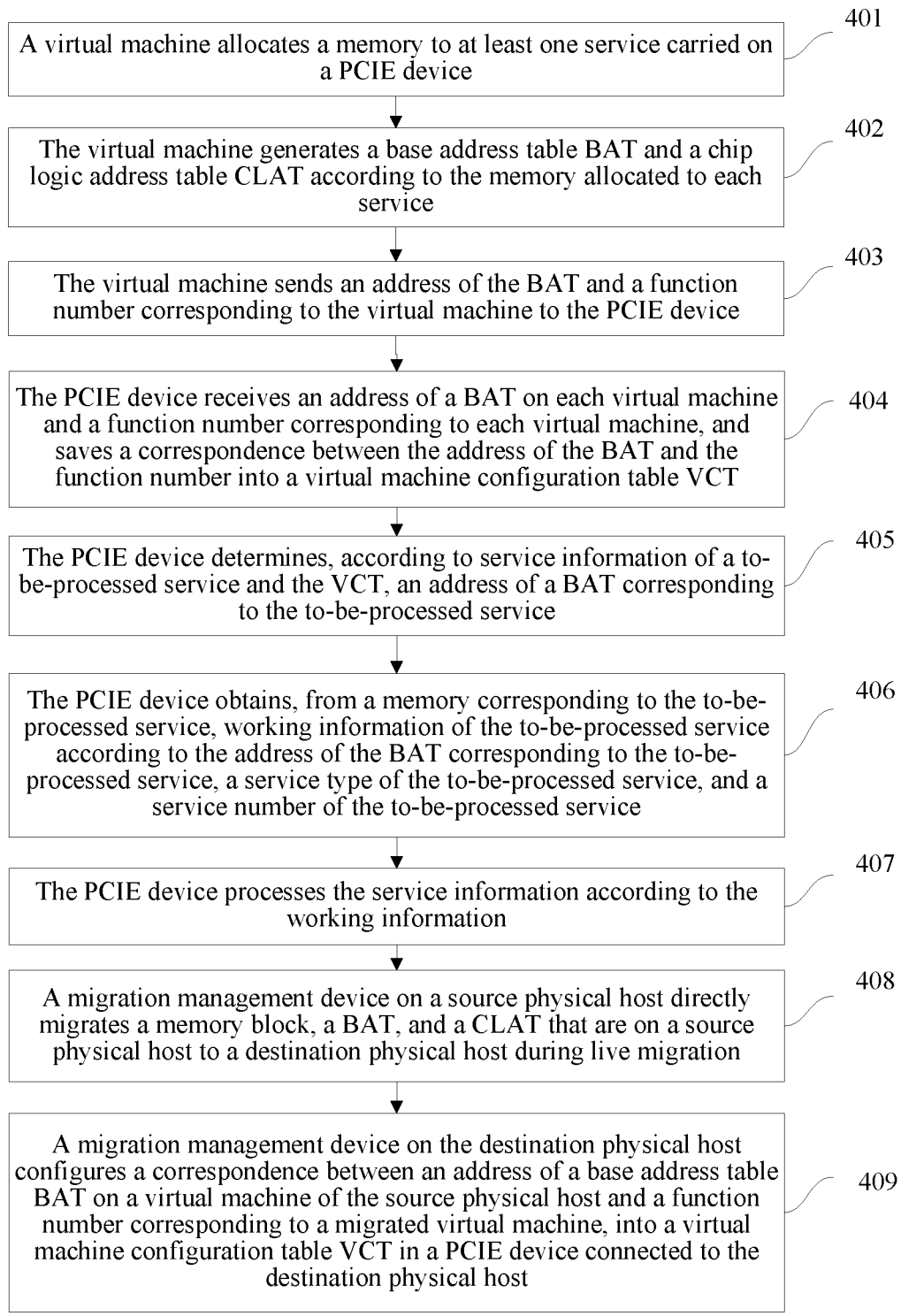
FIG. 5 is a flowchart of a method for managing a memory of a virtual machine according to Embodiment 4 of the present disclosure.

This embodiment of the present disclosure provides a method for managing a memory of a virtual machine. Referring to FIG. 5, the method includes the following steps.

Step 401. A virtual machine allocates a memory to at least one service carried on a PCIE device, where the memory allocated to each service includes multiple memory blocks, each of the multiple memory blocks is used to save working information of a corresponding service, and each memory block is a section of memory space in which guest physical addresses (GPA) are consecutive.

When the virtual machine is started, the virtual machine applies for a memory of a physical host for the PCIE device and allocates the memory that is applied for to a service. Specifically, after receiving an application from the virtual machine, a PCIE device driver of the physical host allocates a memory to the virtual machine. The PCIE device driver of the physical host refers to a driver that is used to drive the PCIE device to work and that is installed on a hard disk of the physical host.

In this embodiment, the working information of the service may be configuration information, a context table, a service resource, or an environment table. In the context table, various statuses of the service are recorded, such as a running status, a queuing status, a timer status, and a statistics collection status.

In this embodiment, the memory blocks allocated by the virtual machine to each service are of a constant size and include consecutive GPAs, that is, sizes of the multiple memory blocks allocated to each service are the same. Specifically, one service may independently occupy one memory block, or multiple services may jointly occupy one memory block. In addition, in this embodiment, a minimum size of the memory block is a size of a memory page and is generally 4K.

Step 402. The virtual machine generates a base address table BAT and a chip logic address table CLAT according to the memory allocated to each service, where the BAT includes a CLAT entry base address corresponding to each service, and the CLAT includes a first address of each memory block.

If there are multiple services of a same service type in the CLAT, to differentiate between the multiple services of the same service type, a service number may be allocated to each service. The service number may be used for calculation of a CLAT entry offset, and details are described in the following.

The service type herein is a type of a service that can be executed by the PCIE device, for example, an offload service, a segmentation service, and a checksum service that are executed by a network adapter.

Further, when the memory is allocated to the service in step 401, a memory block may be further allocated to the BAT and the CLAT. A quantity of bits in a first address of the memory block is constant, and therefore, a quantity of bytes in the first address of the memory block is also constant. For example, the quantity of bits in the first address of the memory block is 64, and a quantity of bytes occupied by a first address of each memory block is 8B. Therefore, if a size of a memory allocated to the CLAT is 4K, a maximum quantity of entries in each CLAT is 4K/8=512. When entries in one CLAT are not enough, a multi-level CLAT needs to be constructed to store a first address of a memory block. That is, the CLAT may be a single-level CLAT or a multi-level CLAT. The multi-level CLAT includes N levels of CLAT, where $N \geq 2$, and N is an integer. Each level of CLAT includes multiple entries. Each entry in the $n^{th}$ level of CLAT is used to indicate an address of the (n+1)th level of CLAT, where $2 \leq n < n+1 < N$, and n is an integer. Each entry in the $N^{th}$ level of CLAT is used to indicate a first address of one of the memory blocks.

Figure 6:
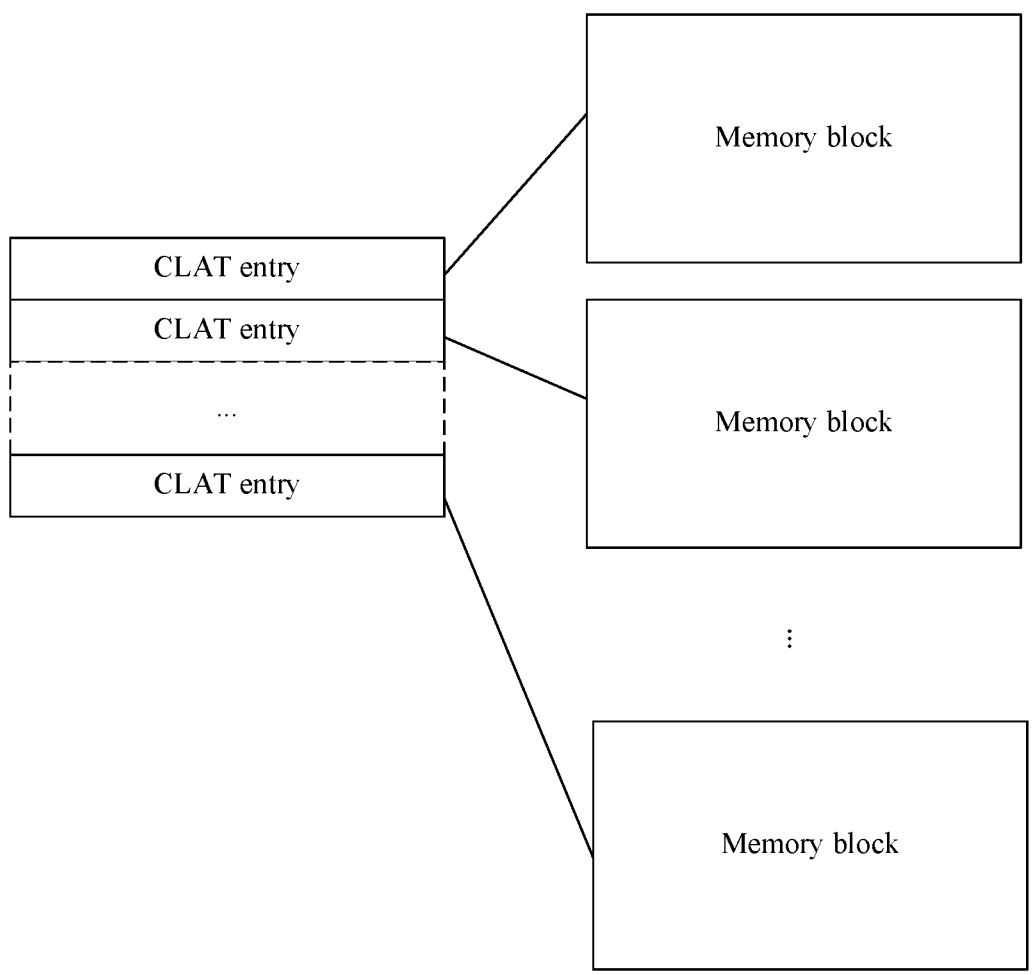
FIG. 6 is a schematic diagram of a single-level CLAT according to Embodiment 4 of the present disclosure.

As shown in FIG. 6, in the single-level CLAT, each entry in the CLAT is corresponding to one memory block.

Figure 7:
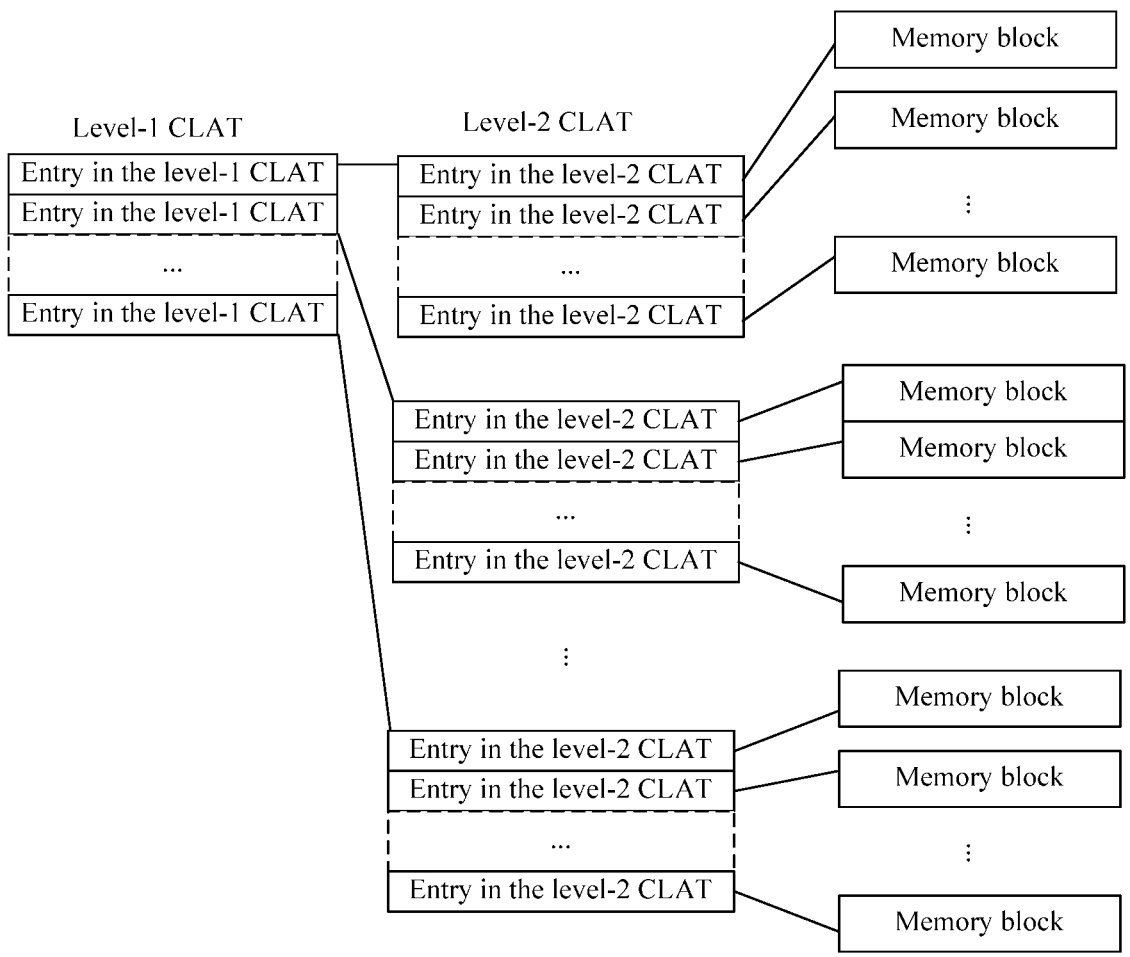
FIG. 7 is a schematic diagram of a multi-level CLAT according to Embodiment 4 of the present disclosure.

As shown in FIG. 7, in the multi-level CLAT, using a two-level CLAT as an example, one entry in the first level of CLAT is corresponding to multiple entries in the second level of CLAT, and one entry in the second level of CLAT is corresponding to one memory block.

Therefore, the BAT may further include a size of a CLAT entry (that is, a size of a memory block allocated to the CLAT), the size of the memory block, a quantity of levels of the CLAT, and the like.

Step 403. The virtual machine sends an address of the BAT and a function number corresponding to the virtual machine to the PCIE device.

The address of the BAT may be a first address of the BAT. The function number is a function number of a PF or VF corresponding to the virtual machine.

Specifically, the function number of the PF or VF corresponding to the virtual machine may be specified by the virtual machine or by a VMM. Therefore, step 403 may alternatively be performed by the VMM.

Further, in this embodiment, the virtual machine may further save a correspondence between the address of the BAT and the function number for subsequent use.

Step 404. The PCIE device receives an address of a BAT on each virtual machine and a function number corresponding to each virtual machine, and saves a correspondence between the address of the BAT and the function number into a virtual machine configuration table (VCT), so that the VCT includes the correspondence between the function number and the address of the BAT.

The VCT is saved in the PCIE device (for example, a network adapter), and the BAT and the CLAT are saved in the virtual machine. Specifically, the VCT may be generated in advance, and after receiving the address of the BAT and the function number, the PCIE device writes the address of the BAT and the function number to the VCT. More specifically, the VCT may be generated by a VMM or the PCIE.

Specifically, the address of the BAT may be a physical address of the physical host (also referred to as a host physical address, HPA for short), or a physical address of the virtual machine (also referred to as a GPA). If the address of the BAT is the GPA, when accessing the address, the PCIE device needs to implement GPA-to-HPA translation by using VT-D (a technology of Intel) or IOMMU (a technology of AMD) in a CPU, or another technology that can automatically implement GPA-to-HPA address translation.

Step 405. The PCIE device determines, according to service information of a to-be-processed service and the VCT, an address of a BAT corresponding to the to-be-processed service, where the at least one service includes the to-be-processed service.

The service information of the to-be-processed service includes service information sent by a host side or service information sent by a network side. The service information sent by the host side is generally service data. The service information sent by the network side is generally a service packet.

Specifically, step 405 may be implemented in the following manner: receiving the service information, sent by the host side or the network side, of the to-be-processed service; determining a function number corresponding to the to-be-processed service, according to a feature in the service information, sent by the host side, of the to-be-processed service or according to a PCIE interface used when the service information, transmitted by the host side, of the to-be-processed service is received, where the feature is used to indicate the function number corresponding to the to-be-processed service; and determining, according to the VCT and the determined function number corresponding to the to-be-processed service, the address of the BAT corresponding to the function number that is corresponding to the to-be-processed service.

In this embodiment, a feature in the service packet sent by the network side may be a field in the service packet. A field used as a feature herein may vary with a type of a PCIE device. For example, when the PCIE device is a network adapter, a destination Media Access Control (MAC) address may be used as a feature. That is, when receiving a service packet, the network adapter may determine a corresponding function number according to the destination MAC address in the service packet. For a case in which the host side sends the service data, a corresponding function number can be determined according to a PCIE interface used when the service data transmitted by the host side is received.

The host side refers to a system including a CPU, a memory, and a hard disk that are of a physical host. The network side refers to an external network side connected to the physical host.

Step 406. The PCIE device obtains, from a memory corresponding to the to-be-processed service, working information of the to-be-processed service according to the address of the BAT corresponding to the to-be-processed service, a service type of the to-be-processed service, and a service number of the to-be-processed service.

In this embodiment, step 406 may be implemented in the following two manners.

Implementation Manner 1:

First, the PCIE device sends a request message to a virtual machine corresponding to the determined function number that is corresponding to the to-be-processed service. The request message includes the address of the BAT corresponding to the function number that is corresponding to the to-be-processed service, the service type of the to-be-processed service, and the service number of the to-be-processed service. The service type is a type of a service that is corresponding to the service packet or the service data received by the PCIE device. The service corresponding to the service packet is a service carried on the service packet. The service corresponding to the service data is a service carried on a service packet that is obtained after the PCIE device processes the service data.

Second, the virtual machine receives the request message that is used to obtain the working information of the to-be-processed service and that is sent by the PCIE device.

Third, the virtual machine sends, to the PCIE device according to the request message, working information in a memory block corresponding to the to-be-processed service.

Specifically, this step may include the following steps.

Step 1. The virtual machine obtains the BAT corresponding to the address of the BAT.

Further, the request message may alternatively carry only the function number but not include the address of the BAT. The virtual machine obtains the BAT according to the function number and the correspondence, stored in the virtual machine, between the address of the BAT and the function number.

Step 2. The virtual machine determines, according to the service type of the to-be-processed service and the BAT, a CLAT entry base address corresponding to the service type.

Step 3. The virtual machine determines an entry offset according to the service number of the to-be-processed service.

Specifically, sizes of multiple memory blocks allocated to the to-be-processed service are the same. The virtual machine calculates the entry offset in the following manner:

When the CLAT is a single-level CLAT, the service number of the to-be-processed service is multiplied by a size of a memory occupied by the working information of the to-be-processed service, and a result of the multiplication is divided by the size of the memory block allocated to the to-be-processed service, to obtain a quotient and a remainder for the single-level CLAT. When the remainder for the single-level CLAT is greater than 0, the entry offset is equal to the quotient for the single-level CLAT, or when the remainder for the single-level CLAT is equal to 0, the entry offset is equal to the quotient for the single-level CLAT minus 1.

When the CLAT is a multi-level CLAT, where the entry offset includes an entry offset of each level of CLAT, an entry offset of the $x^{th}$ level of CLAT is calculated in the following manner:

$$\begin{cases} \dfrac{\text{Service number} \times A}{C^{N-X} \times B} = \begin{array}{l}\text{Quotient and remainder for} \\ \text{the } x^{th} \text{ level of } CLAT, x = 1\end{array} \\ \\ \dfrac{\text{Remainder for the } (x-1)^{th} \text{ level of } CLAT \times A}{C^{N-X} \times B} = \begin{array}{l}\text{Quotient and remainder for} \\ \text{the } x^{th} \text{ level of } CLAT, N \geq x \geq 2\end{array} \end{cases}$$

When a remainder for the $x^{th}$ level of CLAT is greater than 0, the entry offset of the $x^{th}$ level of CLAT is equal to a quotient for the $x^{th}$ level of CLAT; or when a remainder for the $x^{th}$ level of CLAT is equal to 0, the entry offset of the $x^{th}$ level of CLAT is equal to a quotient for the $x^{th}$ level of CLAT minus 1, where A is a size of a memory occupied by the working information of the to-be-processed service, B is the size of the memory block allocated to the to-be-processed service, and C is a quantity of entries in the $N^{th}$ level of CLAT.

When the entry offset of the $x^{th}$ level of CLAT is 0, it indicates that a corresponding entry is the first entry in the $x^{th}$ level of CLAT, when the entry offset of the $x^{th}$ level of CLAT is 1, it indicates that a corresponding entry is the second entry in the $x^{th}$ level of CLAT, and so on.

It should be noted that a reminder for the $N^{th}$ level of CLAT (that is, the last level of CLAT) is used to indicate working information, corresponding to the service number, in a determined memory block. When the reminder for the $N^{th}$ level of CLAT is equal to 0, the working information corresponding to the service number is the last piece of working information in the determined memory block. When the reminder for the $N^{th}$ level of CLAT is greater than 0, the working information corresponding to the service number is the $m^{th}$ piece of working information in the determined memory block, and m is equal to the reminder for the $N^{th}$ level of CLAT.

Calculation of the entry offset is described in the following by using an example. For example, a size of each used memory is 1 KB, a size of a memory block is 4 KB, a quantity of bits in a first address of a memory block is 64, and a size of a memory block allocated to a CLAT is also 4 KB.

For a single-level CLAT, it is assumed that there are 2K services in the virtual machine, and 512 memory blocks with a size of 4K are allocated to the 2K services in step 401. First addresses of the 512 memory blocks are stored in a CLAT. When a service number in the received request message is 100, an entry offset is calculated as follows: 100×1K/4K=25, with a quotient being 25 and a remainder being 0. Therefore, the entry offset is 24, and working information corresponding to a service whose service number is 100 is the last piece of working information in a memory block that is corresponding to the $25^{th}$ entry.

For a multi-level CLAT, it is assumed that there are 16K services in the virtual machine, and a two-level CLAT can support 512×512×4=1M services. Therefore, if the 16K services need to be supported, and the two-level CLAT is used, the first level of CLAT needs to include only eight entries. When the virtual machine is started, 4K memory blocks with a size of 4K are allocated to the 16K services. Then one memory block with the size of 4K is used to generate the first level of CLAT, and eight memory blocks with the size of 4K are used to generate the second level of CLAT.

When a service number in the received request message is 2054, an entry offset of the first level of CLAT is calculated as follows: $2054 \times 1024/4096/512^{2-1}=1$, with a reminder being 6. Therefore, the entry offset of the first level of CLAT is 1, that is, it is determined that an entry in the first level of CLAT is the second entry. An entry offset of the second level of CLAT is calculated as follows: $6 \times 1024/4096/512^{2-2}=1$, with a reminder being 2. Therefore, the entry offset of the second level of CLAT is 1, and working information corresponding to a service whose service number is 2054 is the second piece of working information in a memory block that is corresponding to the second entry in the second level of CLAT.

The service number is allocated when each service starts. For example, for a Transmission Control Protocol (TCP) service, a service number is allocated to the service when a TCP connection is established. The service number may be sequentially allocated starting from 1 or 0. In the foregoing formula, calculation is performed according to the service number that is sequentially allocated starting from 1. When the service number is allocated starting from 0, calculation needs to be performed by adding 1 to the service number. Before this step, when sending the service data to the PCIE device, the host side sends a service number corresponding to the service data to the PCIE device. A service number of the service packet is determined when the service is established, and the PCIE device may save the service number for use.

Step 4. The virtual machine obtains, according to the CLAT entry base address and the entry offset, a CLAT entry corresponding to the to-be-processed service.

Step 5. The virtual machine sends, to the PCIE device, working information in a memory block corresponding to the CLAT entry that is corresponding to the to-be-processed service.

Further, in this step, the virtual machine writes, to a cache of the PCIE device, the working information in the memory block, and the PCIE device reads, from the cache, the working information in the memory block, thereby enhancing data read efficiency and further improving a service processing speed.

Further, when sending the BAT and the CLAT entry to the PCIE device, the virtual machine may write the BAT and the CLAT entry to the cache of the PCIE device for subsequent use by the PCIE device.

Fourth, the PCIE device receives the working information sent by the virtual machine, where the working information is obtained by the virtual machine from a memory block corresponding to the request message.

Implementation Manner 2.

First, the PCIE device reads, according to the address of the BAT corresponding to the to-be-processed service, the BAT corresponding to the to-be-processed service.

Second, the PCIE device determines, according to the service type of the to-be-processed service, a CLAT entry base address corresponding to the service type of the to-be-processed service from the BAT corresponding to the to-be-processed service.

Third, the PCIE device determines an entry offset according to the service number of the to-be-processed service.

In this step, a manner of determining the entry offset is the same as that in implementation manner 1, and details are not further described herein.

Fourth, the PCIE device reads a CLAT entry corresponding to the entry offset and the CLAT entry base address that is corresponding to the service type of the to-be-processed service.

Fifth, the PCIE device reads working information in a memory block corresponding to the CLAT entry.

In this step, the PCIE device can read, to a cache of the PCIE device, the working information in the memory block for subsequent use, thereby improving a service processing speed.

In this embodiment of the present disclosure, implementation manner 2 may be executed by a direct memory access (DMA) read/write module of the PCIE device.

Step 407. The PCIE device processes the service information according to the working information.

Specifically, a packet is processed by a VF corresponding to the foregoing function number.

Step 408. A migration management device on a source physical host directly migrates a memory block, a BAT, and a CLAT that are on a source physical host to a destination physical host during live migration.

The destination physical host and the source physical host are connected to different Peripheral Component Interconnect Express PCIE devices. The PCIE device is a hardware device that supports the single-root I/O virtualization SR-IOV standard. The PCIE device has at least one physical function (PF) and at least one virtual function (VF), and a unique function number is configured for each PF and each VF separately.

Further, the migration management device on the source physical host further writes, to a memory of the destination physical host, data that is in a cache of a PCIE device connected to the source physical host.

Step 409. A migration management device on the destination physical host configures a correspondence between an address of a base address table BAT on a virtual machine of the source physical host and a function number corresponding to a migrated virtual machine, into a virtual machine configuration table (VCT) in a PCIE device connected to the destination physical host.

Specifically, the migration management device on the destination physical host obtains the address of the base address table BAT on the virtual machine of the source physical host and the function number (the function number may be specified by the virtual machine or allocated by a VMM) corresponding to the migrated destination virtual machine. The migration management device on the destination physical host sends the address of the BAT and the function number corresponding to the migrated destination virtual machine to the PCIE device. The PCIE device connected to the destination physical host saves the correspondence between the address of the BAT and the function number into the virtual machine configuration table (VCT).

In this embodiment, the migration management device may be a VMM.

In this embodiment of the present disclosure, a virtual machine allocates a memory to at least one service carried on a PCIE device, generates a BAT and a CLAT according to the memory allocated to each service, and sends an address of the BAT and a function number to the PCIE device, so that the PCIE device can record a correspondence between the address of the BAT and the function number. During service processing, the PCIE device obtains, from the virtual machine, working information of a service according to the correspondence between the address of the BAT and the function number. This is easy to operate and requires less time. During live migration of a virtual machine, problems caused by register migration are avoided, provided that a memory block, a BAT, and a CLAT are directly migrated to a destination physical machine, and that a correspondence between a function number corresponding to a migrated virtual machine and an address of the BAT on a virtual machine of a source physical host is configured into a VCT in a PCIE device after the migration. This is simple and easy to implement, greatly increases a live migration speed of a virtual machine, and reduces a shutdown time.

Embodiment 5

Figure 8:
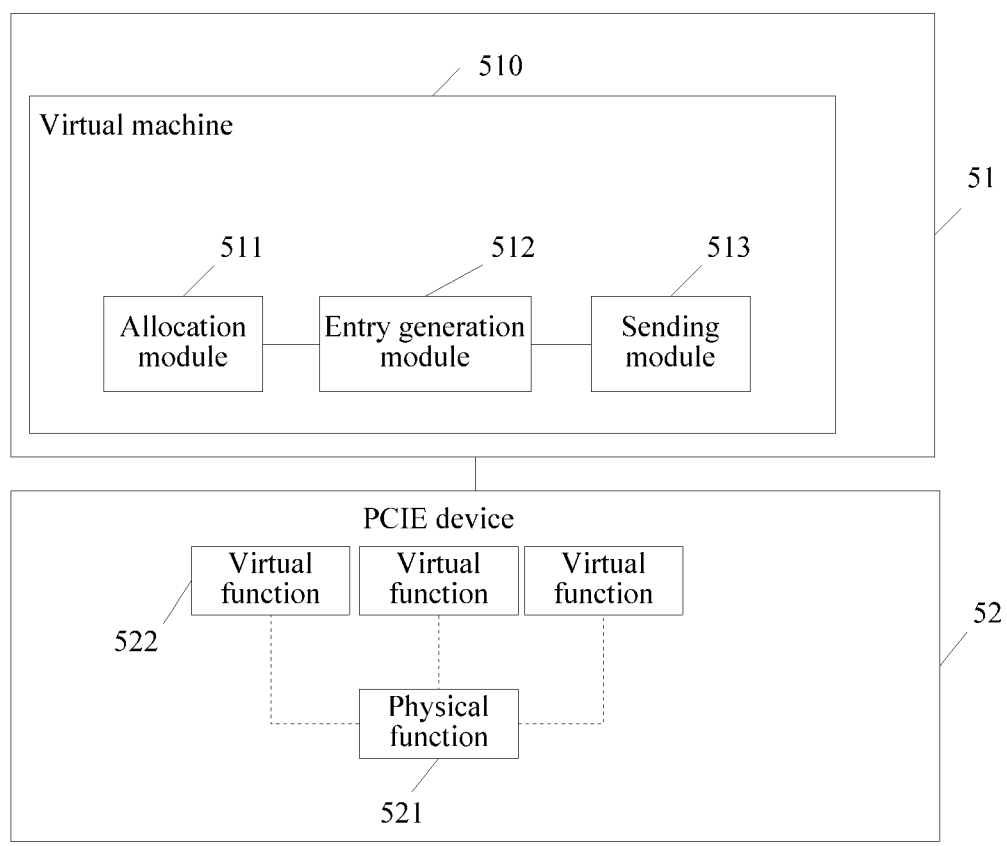
FIG. 8 is a structural block diagram of a physical host according to Embodiment 5 of the present disclosure.

This embodiment of the present disclosure provides a physical host, which is applied to the method provided in Embodiment 1. Referring to FIG. 8, a virtual machine 510 runs on the physical host 51, and the physical host 51 is connected to a Peripheral Component Interconnect Express (PCIE) device 52. The PCIE device 52 is a hardware device that supports the single-root I/O virtualization (SR-IOV) standard. The PCIE device 52 has at least one physical function (PF) 521 and at least one virtual function (VF) 522, and a unique function number is configured for each PF 521 and each VF 522 separately. The virtual machine 510 includes: an allocation module 511, configured to allocate a memory to at least one service carried on the PCIE device, where the memory allocated to each service includes multiple memory blocks, each of the multiple memory blocks is used to save working information of a corresponding service, and each memory block is a section of memory space in which guest physical addresses are consecutive; an entry generation module 512, configured to generate a base address table (BAT) and a chip logic address table (CLAT) according to the memory allocated to each service, where the BAT includes a CLAT entry base address corresponding to each service, and the CLAT includes a first address of each memory block; and a sending module 513, configured to send an address of the BAT and a function number corresponding to the virtual machine to the PCIE device, where the PCIE device is configured to: record a correspondence between the address of the BAT and the function number, and obtain, from the virtual machine, working information of a service according to the correspondence between the address of the BAT and the function number.

In this embodiment of the present disclosure, a virtual machine allocates a memory to at least one service carried on a PCIE device, generates a BAT and a CLAT according to the memory allocated to each service, and sends an address of the BAT and a function number to the PCIE device, so that the PCIE device can record a correspondence between the address of the BAT and the function number. During service processing, the PCIE device obtains, from the virtual machine, working information of a service according to the correspondence between the address of the BAT and the function number. This is easy to operate and requires less time. During live migration of a virtual machine, problems caused by register migration are avoided, provided that a memory block, a BAT, and a CLAT are directly migrated to a destination physical machine, and that a correspondence between a function number corresponding to a migrated virtual machine and an address of the BAT on a virtual machine of a source physical host is configured into a VCT in a PCIE device after the migration. This is simple and easy to implement, greatly increases a live migration speed of a virtual machine, and reduces a shutdown time.

Embodiment 6

Figure 9:
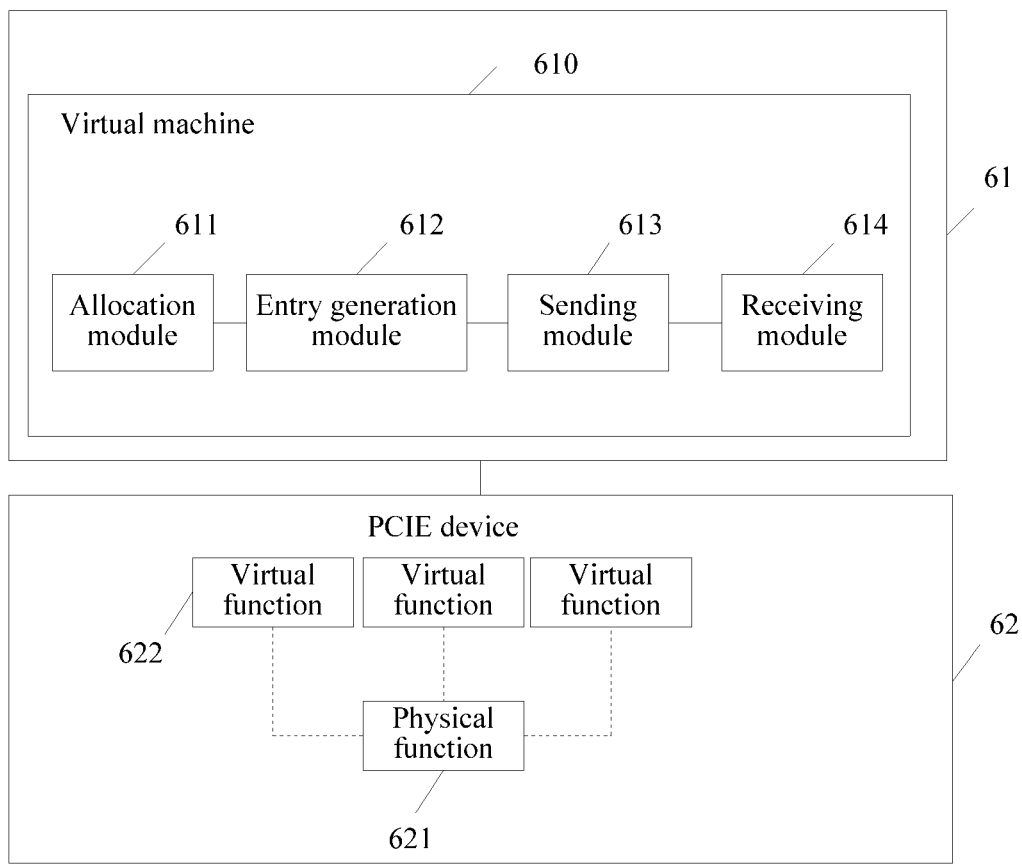
FIG. 9 is a structural block diagram of a physical host according to Embodiment 6 of the present disclosure.

This embodiment of the present disclosure provides a physical host, which is applied to the method provided in Embodiment 4. Referring to FIG. 9, a virtual machine 610 runs on the physical host 61, and the physical host 61 is connected to a Peripheral Component Interconnect Express (PCIE) device 62. The PCIE device 62 is a hardware device that supports the single-root I/O virtualization (SR-IOV) standard. The PCIE device 62 has at least one physical function (PF) 621 and at least one virtual function (VF) 622, and a unique function number is configured for each PF 621 and each VF 622 separately. The virtual machine 610 includes an allocation module 611, an entry generation module 612, and a sending module 613.

The allocation module 611 is configured to allocate a memory to at least one service carried on the PCIE device, where the memory allocated to each service includes multiple memory blocks, each of the multiple memory blocks is used to save working information of a corresponding service, and each memory block is a section of memory space in which guest physical addresses are consecutive.

When the virtual machine 610 is started, the virtual machine 610 applies for a memory of a physical host for the PCIE device 62 and allocates the memory that is applied for to a service. Specifically, after receiving an application from the virtual machine, a PCIE device driver of the physical host 61 allocates a memory to the virtual machine. The PCIE device driver of the physical host 61 refers to a driver that is used to drive the PCIE device to work and that is installed on a hard disk of the physical host.

In this embodiment, the working information of the service may be configuration information, a context table, a service resource, or an environment table. In the context table, various statuses of the service are recorded, such as a running status, a queuing status, a timer status, and a statistics collection status.

In this embodiment, the memory blocks allocated by the virtual machine 610 to each service are of a constant size, and include consecutive GPAs, that is, sizes of the multiple memory blocks allocated to each service are the same. Specifically, one service may independently occupy one memory block, or multiple services may jointly occupy one memory block. In addition, in this embodiment, a minimum size of the memory block is a size of a memory page and is generally 4K.

The entry generation module 612 is configured to generate a base address table BAT and a chip logic address table CLAT according to the memory allocated to each service, where the BAT includes a CLAT entry base address corresponding to each service, and the CLAT includes a first address of each memory block. Specifically, a first address of the BAT may be a physical address of the physical host (HPA), or a physical address of the virtual machine (GPA). If the first address of the BAT is the GPA, when accessing the address, a PCIE adapter needs to implement GPA-to-HPA translation by using VT-D (a technology of Intel) or IOMMU (a technology of AMD) in a CPU, or another technology that can automatically implement GPA-to-HPA address translation.

If there are multiple services of a same service type in the CLAT, to differentiate between the multiple services of the same service type, a service number may be allocated to each service. The service number may be used for calculation of a CLAT entry offset, and details are described in the following.

The service type herein is a type of a service that can be executed by the PCIE device 62, for example, an offload service, a segmentation service, and a checksum service that are executed by a network adapter.

Further, the allocation module 611 may allocate a memory block to the BAT and the CLAT. A quantity of bits in a first address of the memory block is constant, and therefore, a quantity of bytes in the first address of the memory block is also constant. For example, the quantity of bits in the first address of the memory block is 64, and a quantity of bytes occupied by a first address of each memory block is 8B. Therefore, if a size of a memory allocated to the CLAT is 4K, a maximum quantity of entries in each CLAT is 4K/8=512. When entries in one CLAT are not enough, a multi-level CLAT needs to be constructed to store a first address of a memory block. That is, the CLAT may be a single-level CLAT or a multi-level CLAT. The multi-level CLAT includes N levels of CLAT, where N≥2, and N is an integer. Each level of CLAT includes multiple entries. Each entry in the $n^{th}$ level of CLAT is used to indicate an address of the $(n+1)^{th}$ level of CLAT, where 2≤n<n+1<N, and n is an integer. Each entry in the $N^{th}$ level of CLAT is used to indicate a first address of one of the memory blocks.

As shown in FIG. 6, in the single-level CLAT, each entry in the CLAT is corresponding to one memory block.

As shown in FIG. 7, in the multi-level CLAT, using a two-level CLAT as an example, one entry in the first level of CLAT is corresponding to multiple entries in the second level of CLAT, and one entry in the second level of CLAT is corresponding to one memory block.

Therefore, the BAT may further include a size of a CLAT entry (a size of a memory block allocated to the CLAT), the size of the memory block, a quantity of levels of the CLAT, and the like.

The sending module 613 is configured to send an address of the BAT and a function number corresponding to the virtual machine to the PCIE device, where the PCIE device is configured to: record a correspondence between the address of the BAT and the function number, and obtain, from the virtual machine, working information of a service according to the correspondence between the address of the BAT and the function number.

The address of the BAT may be a first address of the BAT. The function number is a function number of a PF or VF corresponding to the virtual machine. The function number of the PF or the VF corresponding to the virtual machine may be specified by the virtual machine or by a VMM.

Further, the virtual machine 610 may further include a receiving module 614.

The receiving module 614 is configured to receive a request message that is used to obtain working information of a to-be-processed service and that is sent by the PCIE device, where the request message includes the address of the BAT, a service type of the to-be-processed service, and a service number of the to-be-processed service.

The sending module 613 is further configured to send, to the PCIE device according to the request message, working information in a memory block corresponding to the to-be-processed service.

In this embodiment, the sending module 613 may be specifically configured to: obtain the BAT corresponding to the address of the BAT; determine, according to the service type of the to-be-processed service and the BAT, a CLAT entry base address corresponding to the service type; determine an entry offset according to the service number of the to-be-processed service; obtain, according to the CLAT entry base address and the entry offset, a CLAT entry corresponding to the to-be-processed service; and send, to the PCIE device, working information in a memory block corresponding to the CLAT entry that is corresponding to the to-be-processed service.

Further, the virtual machine 610 writes, to a cache of the PCIE device, the working information in the memory block, and the PCIE device reads, from the cache, the working information in the memory block, thereby enhancing data read efficiency and further improving a service processing speed.

Further, when sending the BAT and the CLAT entry to the PCIE device, the virtual machine 610 may write the BAT and the CLAT entry to the cache of the PCIE device for subsequent use by the PCIE device.

Further, sizes of multiple memory blocks allocated to the to-be-processed service are the same.

The sending module may be specifically configured to: when the CLAT is a single-level CLAT, multiply the service number of the to-be-processed service by a size of a memory occupied by the working information of the to-be-processed service, and divide a result of the multiplication by the size of the memory block allocated to the to-be-processed service, to obtain a quotient and a remainder for the single-level CLAT, where when the remainder for the single-level CLAT is greater than 0, the entry offset is equal to the quotient for the single-level CLAT, or when the remainder for the single-level CLAT is equal to 0, the entry offset is equal to the quotient for the single-level CLAT minus 1; or when the CLAT is a multi-level CLAT, where the entry offset includes an entry offset of each level of CLAT, calculate an entry offset of the $x^{th}$ level of CLAT in the following manner:

$$\begin{cases} \dfrac{\text{Service number} \times A}{C^{N-X} \times B} = \text{Quotient and remainder for the } x^{th} \text{ level of } CLAT, x = 1 \\ \dfrac{\text{Remainder for the } (x-1)^{th} \text{ level of } CLAT \times A}{C^{N-X} \times B} = \text{Quotient and remainder for the } x^{th} \text{ level of } CLAT, N \geq x \geq 2 \end{cases}$$

where when a remainder for the $x^{th}$ level of CLAT is greater than 0, the entry offset of the $x^{th}$ level of CLAT is equal to a quotient for the $x^{th}$ level of CLAT; or when a remainder for the $x^{th}$ level of CLAT is equal to 0, the entry offset of the $x^{th}$ level of CLAT is equal to a quotient for the $x^{th}$ level of CLAT minus 1, where A is a size of a memory occupied by the working information of the to-be-processed service, B is the size of the memory block allocated to the to-be-processed service, and C is a quantity of entries in the $N^{th}$ level of CLAT.

When the entry offset of the $x^{th}$ level of CLAT is 0, it indicates that a corresponding entry is the first entry in the $x^{th}$ level of CLAT, when the entry offset of the $x^{th}$ level of CLAT is 1, it indicates that a corresponding entry is the second entry in the $x^{th}$ level of CLAT, and so on.

It should be noted that a reminder for the $N^{th}$ level of CLAT (that is, the last level of CLAT) is used to indicate working information, corresponding to the service number, in a determined memory block. When the reminder for the $N^{th}$ level of CLAT is equal to 0, the working information corresponding to the service number is the last piece of working information in the determined memory block. When the reminder for the $N^{th}$ level of CLAT is greater than 0, the working information corresponding to the service number is the $m^{th}$ piece of working information in the determined memory block, and m is equal to the reminder for the $N^{th}$ level of CLAT.

For a specific example, refer to step 406 in Embodiment 4. Detailed descriptions are omitted herein.

In this embodiment of the present disclosure, a virtual machine allocates a memory to at least one service carried on a PCIE device, generates a BAT and a CLAT according to the memory allocated to each service, and sends an address of the BAT and a function number to the PCIE device, so that the PCIE device can record a correspondence between the address of the BAT and the function number. During service processing, the PCIE device obtains, from the virtual machine, working information of a service according to the correspondence between the address of the BAT and the function number. This is easy to operate and requires less time. During live migration of a virtual machine, problems caused by register migration are avoided, provided that a memory block, a BAT, and a CLAT are directly migrated to a destination physical machine, and that a correspondence between a function number corresponding to a migrated virtual machine and an address of the BAT on a virtual machine of a source physical host is configured into a VCT in a PCIE device after the migration. This is simple and easy to implement, greatly increases a live migration speed of a virtual machine, and reduces a shutdown time.

Embodiment 7

Figure 10:
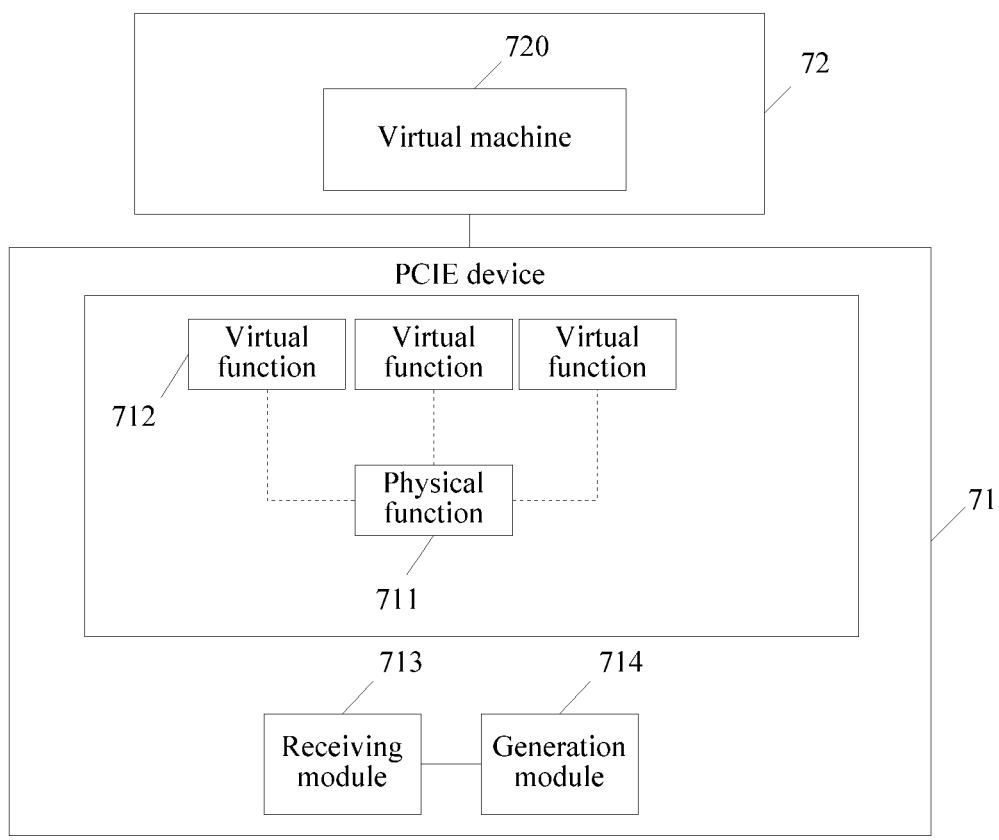
FIG. 10 is a structural block diagram of a PCIE device according to Embodiment 7 of the present disclosure.

This embodiment of the present disclosure provides a PCIE adapter, which is applied to the method provided in Embodiment 2. Referring to FIG. 10, the PCIE device 71 is connected to a physical host 72, and at least one virtual machine 720 runs on the physical host 72. The PCIE device is a hardware device that satisfies the single-root I/O virtualization SR-IOV standard. The PCIE device 71 has at least one physical function (PF) 711 and at least one virtual function (VF) 712, and a unique function number is configured for each PF 711 and each VF 712 separately. Each virtual machine 720 includes a base address table (BAT), and the BAT is generated by a virtual machine, to which the BAT belongs, according to a memory allocated to at least one service carried on the PCIE device. The memory allocated to each service includes multiple memory blocks, each of the multiple memory blocks is used to save working information of a corresponding service, and each memory block is a section of memory space in which guest physical addresses are consecutive. The BAT includes a CLAT entry base address corresponding to each service, and a CLAT includes a first address of each memory block. The PCIE device 71 further includes: a receiving module 713, configured to receive an address of the base address table BAT on each virtual machine and a function number corresponding to each virtual machine; and a generation module 714, configured to save a correspondence between the address of the BAT and the function number into a virtual machine configuration table (VCT), so that the VCT includes the correspondence between the function number and the address of the BAT.

In this embodiment of the present disclosure, a PCIE device receives an address of a BAT and a function number, and saves a correspondence between the address of the BAT and the function number into a virtual machine configuration table (VCT). During service processing, the PCIE device obtains, from a virtual machine, working information of a service according to the correspondence between the address of the BAT and the function number. This is easy to operate and requires less time. During live migration of a virtual machine, problems caused by register migration are avoided, provided that a memory block, a BAT, and a CLAT are directly migrated to a destination physical host, and that a correspondence between a function number corresponding to a migrated virtual machine and an address of the BAT on a virtual machine of a source physical host is configured into a VCT in a PCIE device after the migration. This is simple and easy to implement, greatly increases a live migration speed of a virtual machine, and reduces a shutdown time.

Embodiment 8

Figure 11:
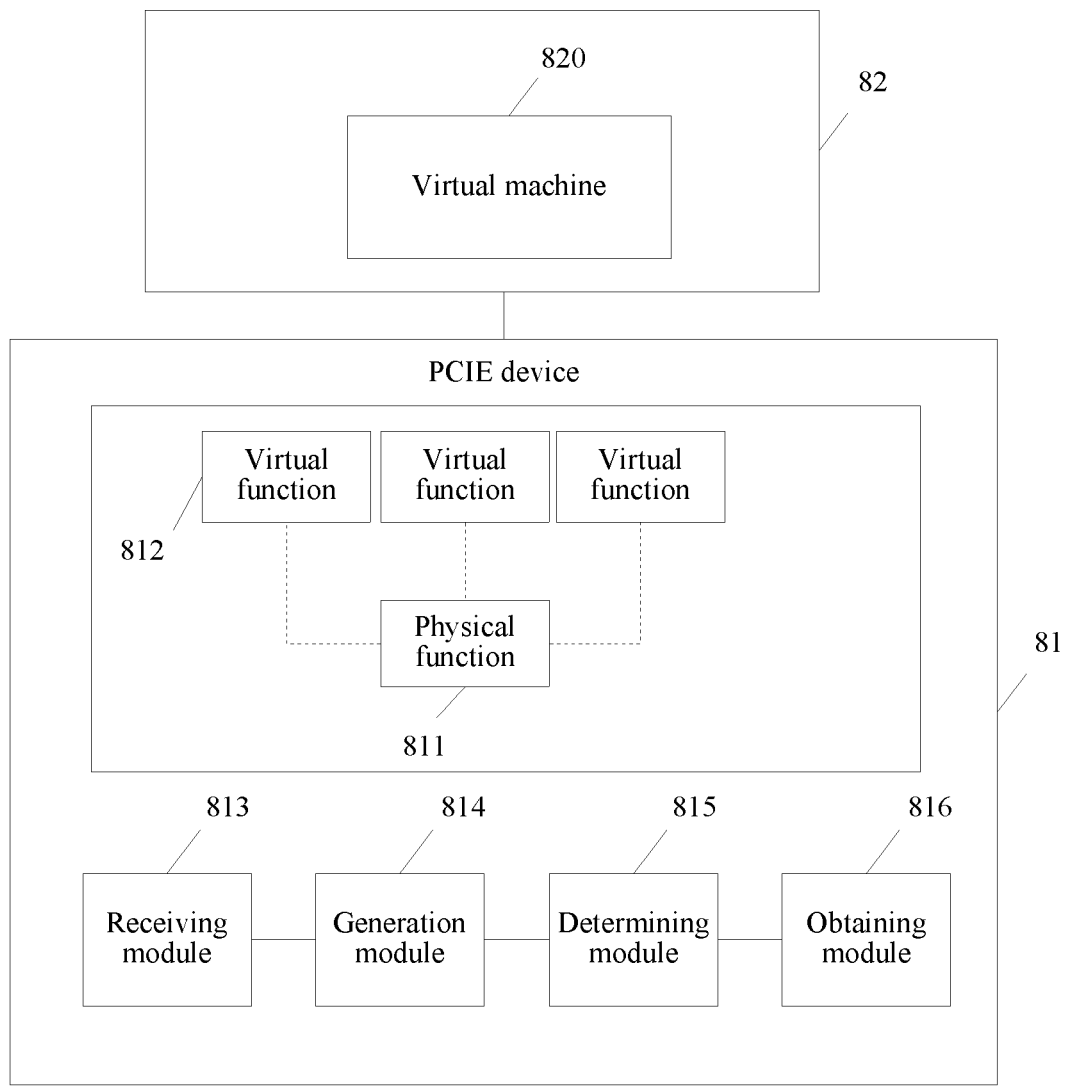
FIG. 11 is a structural block diagram of a PCIE device according to Embodiment 8 of the present disclosure.

This embodiment of the present disclosure provides a PCIE adapter, which is applied to the method provided in Embodiment 4. Referring to FIG. 11, the PCIE device 81 is connected to a physical host 82, and at least one virtual machine 820 runs on the physical host 82. The PCIE device is a hardware device that satisfies the single-root I/O virtualization (SR-IOV) standard. The PCIE device 81 has at least one physical function (PF) 811 and at least one virtual function (VF) 812, and a unique function number is configured for each PF 811 and each VF 812 separately. Each virtual machine 820 includes a base address table (BAT), and the BAT is generated by a virtual machine, to which the BAT belongs, according to a memory allocated to at least one service carried on the PCIE device. The memory allocated to each service includes multiple memory blocks, each of the multiple memory blocks is used to save working information of a corresponding service, and each memory block is a section of memory space in which guest physical addresses are consecutive. The BAT includes a CLAT entry base address corresponding to each service, and the CLAT includes a first address of each memory block. The PCIE device 81 further includes: a receiving module 813, configured to receive an address of the base address table BAT on each virtual machine and a function number corresponding to each virtual machine; and a generation module 814, configured to save a correspondence between the address of the BAT and the function number into a virtual machine configuration table (VCT), so that the VCT includes the correspondence between the function number and the address of the BAT.

The VCT is saved in the PCIE device (for example, a network adapter), and the BAT and the CLAT are saved in the virtual machine. Specifically, the VCT may be generated in advance, and after receiving the address of the BAT and the function number, the PCIE device writes the address of the BAT and the function number to the VCT. More specifically, the VCT may be generated by a VMM or the PCIE.

Specifically, the address of the BAT may be an HPA or a GPA. If the address of the BAT is the GPA, when accessing the address, the PCIE device needs to implement GPA-to-HPA translation by using VT-D (a technology of Intel) or IOMMU (a technology of AMD) in a CPU, or another technology that can automatically implement GPA-to-HPA address translation.

Further, the PCIE device 81 may further include a determining module 815 and an obtaining module 816.

The determining module 815 is configured to determine, according to service information of a to-be-processed service and the VCT, an address of a BAT corresponding to the to-be-processed service.

The service information includes service information sent by a host side or service information sent by a network side. The service information sent by the host side is generally service data. The service information sent by the network side is generally a service packet.

The obtaining module 816 is configured to obtain, from a memory corresponding to the to-be-processed service, working information of the to-be-processed service according to the address of the BAT corresponding to the to-be-processed service, a service type of the to-be-processed service, and a service number of the to-be-processed service.

In this embodiment of the present disclosure, the receiving module 813 may be further configured to receive the service information sent by the host side or the network side.

The determining module 815 may be specifically configured to: determine a function number corresponding to the to-be-processed service, according to a feature in the service information, sent by the host side, of the to-be-processed service or according to a PCIE interface used when the service information, transmitted by the host side, of the to-be-processed service is received, where the feature is used to indicate the function number corresponding to the to-be-processed service; and determine, according to the VCT and the determined function number corresponding to the to-be-processed service, the address of the BAT corresponding to the function number that is corresponding to the to-be-processed service.

In this embodiment, a feature in the service packet sent by the network side may be a field in the service packet. A field used as a feature herein may vary with a type of a PCIE device. For example, when the PCIE device is a network adapter, a destination MAC address may be used as a feature. That is, when receiving a service packet, the network adapter may determine a corresponding function number according to the destination MAC address in the service packet. For a case in which the host side sends the service data, a corresponding function number can be determined according to a PCIE interface used when the service data transmitted by the host side is received.

The host side refers to a system including a CPU, a memory, and a hard disk that are of a physical host. The network side refers to an external network side connected to the physical host.

In an implementation manner of this embodiment of the present disclosure, the obtaining module 816 may be specifically configured to: send a request message to a virtual machine corresponding to the determined function number that is corresponding to the to-be-processed service, where the request message includes the address of the BAT corresponding to the function number that is corresponding to the to-be-processed service, the service type of the to-be-processed service, and the service number of the to-be-processed service; and receive working information, of the to-be-processed service, sent by the virtual machine corresponding to the function number that is corresponding to the to-be-processed service, where the working information of the to-be-processed service is obtained from a memory block corresponding to the request message by the virtual machine corresponding to the function number that is corresponding to the to-be-processed service.

The service type is a type of a service that is corresponding to the service packet or the service data received by the PCIE device. The service corresponding to the service packet is a service carried on the service packet. The service corresponding to the service data is a service carried on a service packet that is obtained after the PCIE device processes the service data.

In another implementation manner of this embodiment of the present disclosure, the obtaining module 816 may be specifically configured to: read, according to the address of the BAT corresponding to the to-be-processed service, the BAT corresponding to the to-be-processed service; determine, according to the service type of the to-be-processed service, a CLAT entry base address corresponding to the service type of the to-be-processed service from the BAT corresponding to the to-be-processed service; determine an entry offset according to the service number of the to-be-processed service; read a CLAT entry corresponding to the entry offset and the CLAT entry base address that is corresponding to the service type of the to-be-processed service; and read working information in a memory block corresponding to the CLAT entry.

In this embodiment of the present disclosure, the CLAT is a single-level CLAT or a multi-level CLAT. The multi-level CLAT includes N levels of CLAT, where N≥2, and N is an integer. Each level of CLAT includes multiple entries. Each entry in the $n^{th}$ level of CLAT is used to indicate an address of the $(n+1)^{th}$ level of CLAT, where 2≤n<n+1<N, and n is an integer. Each entry in the $N^{th}$ level of CLAT is used to indicate a first address of one of the memory blocks.

In this embodiment of the present disclosure, sizes of the multiple memory blocks allocated to the to-be-processed service are the same.

The obtaining module 816 may be specifically configured to: when the CLAT is a single-level CLAT, multiply the service number of the to-be-processed service by a size of a memory occupied by the working information of the to-be-processed service, and divide a result of the multiplication by the size of the memory block allocated to the to-be-processed service, to obtain a quotient and a remainder for the single-level CLAT, where when the remainder for the single-level CLAT is greater than 0, the entry offset is equal to the quotient for the single-level CLAT, or when the remainder for the single-level CLAT is equal to 0, the entry offset is equal to the quotient for the single-level CLAT minus 1; or when the CLAT is a multi-level CLAT, where the entry offset includes an entry offset of each level of CLAT, calculate an entry offset of the $x^{th}$ level of CLAT in the following manner:

$$\begin{cases} \dfrac{\text{Service number} \times A}{C^{N-X} \times B} = \text{Quotient and remainder for the } x^{th} \text{ level of } CLAT, x = 1 \\ \dfrac{\text{Remainder for the } (x-1)^{th} \text{ level of } CLAT \times A}{C^{N-X} \times B} = \text{Quotient and remainder for the } x^{th} \text{ level of } CLAT, N \geq x \geq 2 \end{cases}$$

where when a remainder for the $x^{th}$ level of CLAT is greater than 0, the entry offset of the $x^{th}$ level of CLAT is equal to a quotient for the $x^{th}$ level of CLAT; or when a remainder for the $x^{th}$ level of CLAT is equal to 0, the entry offset of the $x^{th}$ level of CLAT is equal to a quotient for the $x^{th}$ level of CLAT minus 1, where A is a size of a memory occupied by the working information of the to-be-processed service, B is the size of the memory block allocated to the to-be-processed service, and C is a quantity of entries in the $N^{th}$ level of CLAT.

When the entry offset of the $x^{th}$ level of CLAT is 0, it indicates that a corresponding entry is the first entry in the $x^{th}$ level of CLAT, when the entry offset of the $x^{th}$ level of CLAT is 1, it indicates that a corresponding entry is the second entry in the $x^{th}$ level of CLAT, and so on.

It should be noted that a reminder for the $N^{th}$ level of CLAT (that is, the last level of CLAT) is used to indicate working information, corresponding to the service number, in a determined memory block. When the reminder for the $N^{th}$ level of CLAT is equal to 0, the working information corresponding to the service number is the last piece of working information in the determined memory block. When the reminder for the $N^{th}$ level of CLAT is greater than 0, the working information corresponding to the service number is the $m^{th}$ piece of working information in the determined memory block, and m is equal to the reminder for the $N^{th}$ level of CLAT.

Calculation of the entry offset is described in the following by using an example. For example, a size of each used memory is 1 KB, a size of a memory block is 4K B, a quantity of bits in a first address of a memory block is 64, and a size of a memory block allocated to a CLAT is also 4K B.

For a specific example, refer to step 406 in Embodiment 4. Detailed descriptions are omitted herein.

In this embodiment of the present disclosure, a PCIE device receives an address of a BAT and a function number, and saves a correspondence between the address of the BAT and the function number into a virtual machine configuration table (VCT). During service processing, the PCIE device obtains, from a virtual machine, working information of a service according to the correspondence between the address of the BAT and the function number. This is easy to operate and requires less time. During live migration of a virtual machine, problems caused by register migration are avoided, provided that a memory block, a BAT, and a CLAT are directly migrated to a destination physical host, and that a correspondence between a function number corresponding to a migrated virtual machine and an address of the BAT on a virtual machine of a source physical host is configured into a VCT in a PCIE device after the migration. This is simple and easy to implement, greatly increases a live migration speed of a virtual machine, and reduces a shutdown time.

Embodiment 9

Figure 12:
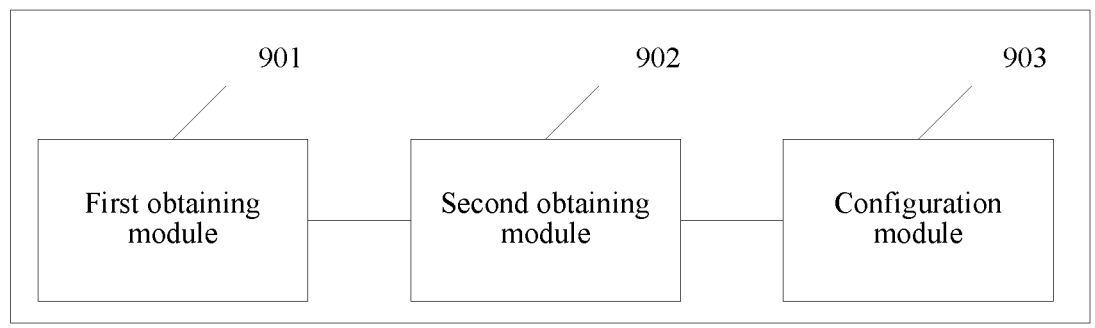
FIG. 12 is a structural block diagram of a migration management device according to Embodiment 9 of the present disclosure.

This embodiment of the present disclosure provides a migration management device. The migration management device is disposed on a destination physical host and applied to the method provided in Embodiment 3. Referring to FIG. 12, the migration management device includes: a first obtaining module 901, configured to obtain an address of a base address table BAT on a virtual machine of a source physical host during live migration, where the destination physical host and the source physical host are connected to different Peripheral Component Interconnect Express (PCIE) devices, the PCIE device is a hardware device that supports the single-root I/O virtualization (SR-IOV) standard, and the PCIE device has at least one physical function (PF) and at least one virtual function (VF), where a unique function number is configured for each PF and each VF separately; a second obtaining module 902, configured to obtain a function number corresponding to a migrated virtual machine; and a configuration module 903, configured to configure a correspondence between the address of the BAT and the function number into a virtual machine configuration table (VCT) in a PCIE device connected to the destination physical host.

In this embodiment of the present disclosure, during live migration of a virtual machine, problems caused by register migration are avoided, provided that a memory block, a BAT, and a CLAT are automatically and directly migrated to a destination physical machine during a migration process, and that a correspondence between a function number corresponding to a migrated virtual machine and an address of the BAT on a virtual machine of a source physical host is configured into a VCT in a PCIE device after the migration. This is simple and easy to implement, greatly increases a live migration speed of a virtual machine, and reduces a shutdown time.

It should be noted that when the virtual machine provided in the foregoing embodiments manages a memory of the virtual machine, division of the foregoing function modules is only an example for description. In an actual application, the foregoing functions may be implemented by different function modules according to a requirement, or one function thereof may be implemented by more modules, or multiple functions thereof are implemented by one module. That is, an internal structure of a device is divided into different function modules to implement some or all functions described above. In addition, the physical host provided in the foregoing embodiments and the embodiments of the method for managing a memory of a virtual machine belong to a same idea. For a specific implementation process thereof, refer to the method embodiments, and details are not further described herein.

The sequence numbers of the foregoing embodiments of the present disclosure are only for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, an optical disc, or the like.

The foregoing descriptions are only examples of embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A method, comprising:
separately allocating, by a virtual machine, a respective memory to each service of one or more services carried on a Peripheral Component Interconnect Express (PCIE) device, wherein each respective memory allocated to each service of the one or more services comprises a respective plurality of memory blocks, each respective plurality of memory blocks is used to save working information of a corresponding service, and each memory block of each respective plurality of memory blocks is a respective section of memory space in which guest physical addresses are consecutive, wherein the virtual machine runs on a physical host, the physical host is connected to the PCIE device, the PCIE device is a hardware device that supports the single-root I/O virtualization (SR-IOV) standard, and the PCIE device enables a plurality of functions, each function of the plurality of functions is a physical function (PF) or a virtual function (VF), and wherein a unique function number is separately configured for each of the plurality of functions;
generating, by the virtual machine, a base address table (BAT) and a chip logic address table (CLAT) according to the respective memory allocated to each service, wherein the BAT comprises a respective CLAT entry base address corresponding to each service, and the CLAT comprises a first address of each memory block;
sending, by the virtual machine, an address of the BAT and a first function number corresponding to the virtual machine to the PCIE device, wherein the first function number uniquely corresponds to a first function of the plurality of functions;
receiving, by the virtual machine from the PCIE device, a request message that requests to obtain working information of a to-be-processed service of the one or more services, wherein the request message comprises the address of the BAT, a service type of the to-be-processed service, and a service number of the to-be-processed service; and
sending, by the virtual machine to the PCIE device according to the request message, working information in a memory block corresponding to the to-be-processed service.

2. The method according to claim 1, wherein sending the working information in the memory block corresponding to the to-be-processed service comprises:
obtaining the BAT corresponding to the address of the BAT;
determining, according to the service type of the to-be-processed service and the BAT, a CLAT entry base address corresponding to the service type;
determining an entry offset according to the service number of the to-be-processed service;
obtaining, according to the CLAT entry base address and the entry offset, a CLAT entry corresponding to the to-be-processed service; and
sending, to the PCIE device, the working information in a memory block corresponding to the CLAT entry that corresponds to the to-be-processed service.

3. The method according to claim 2, wherein the CLAT is a single-level CLAT or a multi-level CLAT;
wherein the multi-level CLAT comprises N levels of CLAT, wherein N≥2, and N is an integer;
wherein each level of CLAT comprises multiple entries;
wherein each entry in the $n^{th}$ level of CLAT indicates an address of the $(n+1)^{th}$ level of CLAT, wherein 2≤n+1<N, and n is an integer; and
wherein each entry in the $N^{th}$ level of CLAT indicates a first address of one of the memory blocks.

4. The method according to claim 3, wherein sizes of the plurality of memory blocks allocated to the to-be-processed service are the same; and
wherein determining the entry offset according to the service number of the to-be-processed service comprises:
when the CLAT is a single-level CLAT, multiplying the service number of the to-be-processed service by a size of a memory occupied by the working information of the to-be-processed service, and dividing a result of the multiplication by the size of the memory block allocated to the to-be-processed service, to obtain a quotient and a remainder for the single-level CLAT, wherein when the remainder for the single-level CLAT is greater than 0, the entry offset is equal to the quotient for the single-level CLAT, or when the remainder for the single-level CLAT is equal to 0, the entry offset is equal to the quotient for the single-level CLAT minus 1; or when the CLAT is a multi-level CLAT, wherein the entry offset comprises an entry offset of each level of CLAT, calculating an entry offset of the $x^{th}$ level of CLAT in the following manner:

$$\begin{cases} \dfrac{\text{Service\_number} \times A}{C^{N-X} \times B} = \begin{array}{l}\text{Quotient and remainder for}\\ \text{the } x^{th} \text{ level of } CLAT, x = 1\end{array} \\ \\ \dfrac{\text{Remainder for the }(x-1)^{th} \text{ level of } CLAT \times A}{C^{N-X} \times B} = \begin{array}{l}\text{Quotient and remainder for}\\ \text{the } x^{th} \text{ level of } CLAT, N \geq x \geq 2\end{array} \end{cases}$$

wherein when a remainder for the $x^{th}$ level of CLAT is greater than 0, the entry offset of the $x^{th}$ level of CLAT is equal to a quotient for the $x^{th}$ level of CLAT; or when a remainder for the $x^{th}$ level of CLAT is equal to 0, the entry offset of the $x^{th}$ level of CLAT is equal to a quotient for the $x^{th}$ level of CLAT minus 1, wherein A is a size of a memory occupied by the working information of the to-be-processed service, B is the size of the memory block allocated to the to-be-processed service, and C is a quantity of entries in the $N^{th}$ level of CLAT.

5. A method for configuring a Peripheral Component Interconnect Express (PCIE) device, comprising:

receiving, by the PCIE device, an address of each base address table (BAT) respectively comprised on each virtual machine of one or more virtual machines running on a physical host, and a respective function number corresponding to each virtual machine of the one or more virtual machines, wherein the PCIE device is connected to the physical host, the PCIE device comprises a hardware device that supports the single-root I/O virtualization (SR-IOV) standard, and the PCIE device enables a plurality of functions, and each function of the plurality of functions is a physical function (PF) or a virtual function (VF), wherein a unique function number is separately configured for each function of the plurality of functions, wherein each BAT is generated by a respective virtual machine to which the respective BAT belongs according to a respective memory that is allocated to each of one or more services carried on the PCIE device, each respective memory allocated to each service respectively comprises a plurality of memory blocks, each of the respective plurality of memory blocks is used to save working information of a corresponding service, each memory block is a section of memory space in which guest physical addresses are consecutive, each BAT comprises a chip logic address table (CLAT) entry base address corresponding to each service corresponding to the virtual machine that comprises the respective BAT, and each CLAT comprises a first address of a respective memory block;

saving a correspondence between the address of each BAT and the respective function number corresponding to each BAT into a virtual machine configuration table (VCT);

determining, by the PCIE device according to service information of a to-be-processed service of the one or more services and the VCT, an address of a first BAT running on a first virtual machine of the one or more virtual machines, the first BAT corresponding to the to-be-processed service; and obtaining, by the PCIE device from a memory corresponding to the to-be-processed service, working information of the to-be-processed service according to the address of the first BAT corresponding to the to-be-processed service, a service type of the to-be-processed service, and a service number of the to-be-processed service.

6. The method according to claim 5, wherein determining the address of the first BAT corresponding to the to-be-processed service comprises:

receiving the service information, sent by a host side or a network side, of the to-be-processed service;

determining a function number corresponding to the to-be-processed service, according to a feature in the service information, sent by the host side, of the to-be-processed service or according to a PCIE interface used when the service information, transmitted by the host side, of the to-be-processed service is received, wherein the feature indicates the function number corresponding to the to-be-processed service; and determining, according to the VCT and the determined function number corresponding to the to-be-processed service, the address of the first BAT corresponding to the function number that is corresponding to the to-be-processed service.

7. The method according to claim 6, wherein obtaining the working information of the to-be-processed service according to the address of the first BAT corresponding to the to-be-processed service, the service type of the to-be-processed service, and the service number of the to-be-processed service comprises:

sending a request message to the first virtual machine corresponding to the determined function number that corresponds to the to-be-processed service, wherein the request message comprises the address of the first BAT corresponding to the function number that corresponds to the to-be-processed service, the service type of the to-be-processed service, and the service number of the to-be-processed service; and receiving working information, of the to-be-processed service, sent by the first virtual machine corresponding to the function number that corresponds to the to-be-processed service, wherein the working information of the to-be-processed service is obtained from a memory block corresponding to the request message by the first virtual machine corresponding to the function number that is corresponding to the to-be-processed service.

8. The method according to claim 5, wherein obtaining the working information of the to-be-processed service according to the address of the first BAT corresponding to the to-be-processed service, the service type of the to-be-processed service, and the service number of the to-be-processed service comprises:

reading, according to the address of the first BAT corresponding to the to-be-processed service, the first BAT corresponding to the to-be-processed service;

determining, according to the service type of the to-be-processed service, a CLAT entry base address corresponding to the service type of the to-be-processed service from the first BAT corresponding to the to-be-processed service;

determining an entry offset according to the service number of the to-be-processed service;
reading a CLAT entry corresponding to the entry offset and the CLAT entry base address that is corresponding to the service type of the to-be-processed service; and
reading working information in a memory block corresponding to the CLAT entry.

9. The method according to claim 8, wherein the CLAT is a single-level CLAT or a multi-level CLAT;
wherein the multi-level CLAT comprises N levels of CLAT, wherein N≥2, and N is an integer;
wherein each level of CLAT comprises multiple entries;
wherein each entry in the $n^{th}$ level of CLAT indicates an address of the $(n+1)^{th}$ level of CLAT, wherein 2≤n<n+1<N, and n is an integer; and
wherein each entry in the $N^{th}$ level of CLAT indicates a first address of one of the memory blocks.

10. A physical host, comprising:
a processor; and
a computer-readable storage medium storing a program to be executed by the processor, the program including instructions for:
implementing one or more virtual machines that run on the physical host;
allocating, by a first virtual machine of the one or more virtual machines, a respective memory to each of one or more services carried on a Peripheral Component Interconnect Express (PCIE) device, wherein the respective memory allocated to each service comprises a respective plurality of memory blocks, each of the respective plurality of memory blocks is used to save working information of a corresponding service, and each memory block is a respective section of memory space in which guest physical addresses are consecutive, wherein the physical host is connected to the PCIE device, the PCIE device comprises a hardware device that supports the single-root I/O virtualization (SR-IOV) standard, and the PCIE device enables a plurality of functions, and each function of the plurality of functions is a physical function (PF) or a virtual function (VF), wherein a unique function number is separately configured for each function of the plurality of functions;
generating, by the first virtual machine, a base address table (BAT) and a chip logic address table (CLAT) according to the respective memory allocated to each service of the one or more services, wherein the BAT comprises a CLAT entry base address corresponding to each service, and the CLAT comprises a first address of each memory block;
sending, by the first virtual machine, an address of the BAT and a first function number corresponding to the first virtual machine to the PCIE device, wherein the first function number uniquely corresponds to a first function of the plurality of functions;
receiving, by the first virtual machine from the PCIE device, a request message that requests to obtain working information of a to-be-processed service of the one or more services, wherein the request message comprises the address of the BAT, a service type of the to-be-processed service, and a service number of the to-be-processed service; and
sending, by the first virtual machine to the PCIE device according to the request message, working information in a memory block corresponding to the to-be-processed service.

11. The physical host according to claim 10, wherein the first virtual machine is configured to:
obtain the BAT corresponding to the address of the BAT;
determine, according to the service type of the to-be-processed service and the BAT, a CLAT entry base address corresponding to the service type;
determine an entry offset according to the service number of the to-be-processed service;
obtain, according to the CLAT entry base address and the entry offset, a CLAT entry corresponding to the to-be-processed service; and
send, to the PCIE device, working information in a memory block corresponding to the CLAT entry that corresponds to the to-be-processed service.

12. The physical host according to claim 11, wherein the CLAT is a single-level CLAT or a multi-level CLAT;
wherein the multi-level CLAT comprises N levels of CLAT, wherein N≥2, and N is an integer;
wherein each level of CLAT comprises multiple entries;
wherein each entry in the $n^{th}$ level of CLAT indicates an address of the $(n+1)^{th}$ level of CLAT, wherein 2≤n<n+1<N, and n is an integer; and
wherein each entry in the $N^{th}$ level of CLAT indicates a first address of one of the memory blocks.

13. The physical host according to claim 12, wherein sizes of the plurality of memory blocks allocated to the to-be-processed service are the same; and
wherein the first virtual machine is configured to:
when the CLAT is a single-level CLAT, multiply the service number of the to-be-processed service by a size of a memory occupied by the working information of the to-be-processed service, and divide a result of the multiplication by the size of the memory block allocated to the to-be-processed service, to obtain a quotient and a remainder for the single-level CLAT, wherein when the remainder for the single-level CLAT is greater than 0, the entry offset is equal to the quotient for the single-level CLAT, or when the remainder for the single-level CLAT is equal to 0, the entry offset is equal to the quotient for the single-level CLAT minus 1; or
when the CLAT is a multi-level CLAT, wherein the entry offset comprises an entry offset of each level of CLAT, calculate an entry offset of the $x^{th}$ level of CLAT in the following manner:

$$\begin{cases} \dfrac{\text{Service number} \times A}{C^{N-X} \times B} = \begin{array}{l}\text{Quotient and remainder for}\\ \text{the } x^{th} \text{ level of } CLAT, x = 1\end{array} \\[2em] \dfrac{\text{Remainder for the } (x-1)^{th} \text{ level of } CLAT \times A}{C^{N-X} \times B} = \begin{array}{l}\text{Quotient and remainder for}\\ \text{the } x^{th} \text{ level of } CLAT, N \geq x \geq 2\end{array} \end{cases}$$

wherein when a remainder for the $x^{th}$ level of CLAT is greater than 0, the entry offset of the $x^{th}$ level of CLAT is equal to a quotient for the $x^{th}$ level of CLAT; or when a remainder for the $x^{th}$ level of CLAT is equal to 0, the entry offset of the $x^{th}$ level of CLAT is equal to a quotient for the $x^{th}$ level of CLAT minus 1, wherein A is a size of a memory occupied by the working information of the to-be-processed service, B is the size of the memory block allocated to the to-be-processed service, and C is a quantity of entries in the $N^{th}$ level of CLAT.

14. A Peripheral Component Interconnect Express (PCIE) device, comprising:
- a video card; and
- a PCIE adapter, configured to:
  - for each virtual machine of one or more virtual machines running on a physical host, receive an address of a base address table (BAT) on each respective virtual machine and a function number corresponding to each respective virtual machine, wherein the PCIE adapter is connected to the physical host, the PCIE adapter satisfies the single-root I/O virtualization (SR-IOV) standard, and the PCIE adapter enables a plurality of functions, wherein each function of the plurality of functions is a physical function (PF) or a virtual function (VF), wherein a unique function number is separately configured for each function, wherein each virtual machine comprises a respective BAT, wherein each BAT is generated by the respective virtual machine to which the respective BAT belongs according to a respective memory allocated to one or more services carried on the PCIE adapter, wherein each respective memory allocated to each service comprises a plurality of memory blocks, each of the plurality of memory blocks is used to save working information of a corresponding service, each memory block is a section of memory space in which guest physical addresses are consecutive, and wherein each BAT comprises a respective chip logic address table (CLAT) entry base address corresponding to each service, and a respective CLAT comprises a first address of each memory block;
  - save a correspondence between the address of each BAT and each corresponding function number into a virtual machine configuration table (VCT);
  - determine, according to service information of a to-be-processed service and the VCT, an address of a BAT corresponding to the to-be-processed service, wherein the to-be-processed service is comprised in the one or more services carried on the PCIE adapter; and
  - obtain, from a memory corresponding to the to-be-processed service, working information of the to-be-processed service according to the address of the BAT corresponding to the to-be-processed service, a service type of the to-be-processed service, and a service number of the to-be-processed service.

15. The PCIE device according to claim 14, wherein the PCIE adapter is further configured to receive the service information, sent by a host side or a network side, of the to-be-processed service; and wherein the PCIE adapter is further configured to:
- determine a function number corresponding to the to-be-processed service, according to a feature in the service information, sent by the host side, of the to-be-processed service or according to a PCIE interface used when the service information, transmitted by the host side, of the to-be-processed service is received, wherein the feature is used to indicate the function number corresponding to the to-be-processed service; and
- determine, according to the VCT and the determined function number corresponding to the to-be-processed service, the address of the BAT corresponding to the function number that is corresponding to the to-be-processed service.

16. The PCIE device according to claim 15, wherein the PCIE adapter is further configured to:
- send a request message to a virtual machine corresponding to the determined function number that corresponds to the to-be-processed service, wherein the request message comprises the address of the BAT corresponding to the function number that corresponds to the to-be-processed service, the service type of the to-be-processed service, and the service number of the to-be-processed service; and
- receive working information, of the to-be-processed service, sent by the virtual machine corresponding to the function number that corresponds to the to-be-processed service, wherein the working information of the to-be-processed service is obtained from a memory block corresponding to the request message by the virtual machine corresponding to the function number that is corresponding to the to-be-processed service.

* * * * *